(12) United States Patent
Ranjan et al.

(10) Patent No.: US 11,657,465 B2
(45) Date of Patent: May 23, 2023

(54) BUILDING SYSTEM WITH AUTOMATIC INCIDENT IDENTIFICATION

(71) Applicant: Johnson Controls Tyco IP Holdings LLP, Milwaukee, WI (US)

(72) Inventors: Ravi Ranjan, Pune (IN); Vikas Sharma, New Delhi (IN); Srijata Sarkar, Pune (IN); Sagar Ganesh Lohiya, Pune (IN); Sannidhya Roy, Kolkata (IN); Abhishek Jain, Mumbai (IN); Sachin Yashwant Pate, Mumbai (IN); Debashree Paul, Mumbai (IN); Saunak Ganguly, Mumbai (IN); Vijay Sopanrao Patil, Mumbai (IN); Saurabh Gunvantrao Raut, Lohegaon (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 342 days.

(21) Appl. No.: 16/884,792

(22) Filed: May 27, 2020

(65) Prior Publication Data

US 2020/0380623 A1 Dec. 3, 2020

(30) Foreign Application Priority Data

May 27, 2019 (IN) .............................. 201921020928

(51) Int. Cl.
*G06Q 50/16* (2012.01)
*G05B 15/02* (2006.01)

(52) U.S. Cl.
CPC ........... *G06Q 50/163* (2013.01); *G05B 15/02* (2013.01)

(58) Field of Classification Search
CPC ................................ G06Q 50/63; G05B 15/02
See application file for complete search history.

(56) References Cited

U.S. PATENT DOCUMENTS

| 10,417,451 | B2 | 9/2019 | Park et al. |
| 11,449,015 | B2* | 9/2022 | Locke ................ G05B 13/0265 |
| 2017/0242413 | A1* | 8/2017 | Piaskowski ......... H04L 12/2809 |
| 2019/0390866 | A1* | 12/2019 | Brisbine ................... F24F 11/56 |
| 2020/0137119 | A1 | 4/2020 | Jin et al. |
| 2020/0306958 | A1* | 10/2020 | Karmakar ................ B25J 9/161 |

FOREIGN PATENT DOCUMENTS

| WO | WO-2018098149 A1 * | 5/2018 | ............. G05B 15/02 |
| WO | WO-2020018147 A1 * | 1/2020 | ............. F24F 11/46 |

* cited by examiner

*Primary Examiner* — Kevin Kim
(74) *Attorney, Agent, or Firm* — Foley & Lardner LLP

(57) ABSTRACT

A method for identifying and managing incidents in a building management system (BMS) of a building. The method includes identifying at least one or more entities, one or more intents, or one or more keywords from a text segment; extracting one or more parameters from at least one of the identified one or more entities, the identified one or more intents, or the identified one or more keywords, the one or more parameters comprising a piece of building equipment of the building and a characteristic of the piece of building equipment; determining a satisfied incident of a plurality of incidents based on the extracted one or more parameters, the satisfied incident identifying an issue with the piece of building equipment and associated with a second entity; and transmitting an indication of the satisfied incident to a computing device of the second entity.

18 Claims, 22 Drawing Sheets

Example Building Modeled in Brick

FIG. 21

BUILDING SYSTEM WITH AUTOMATIC INCIDENT IDENTIFICATION

CROSS-REFERENCE TO RELATED PATENT APPLICATION

This application claims the benefit of and priority to Indian Provisional Patent Application No. 201921020928 filed May 27, 2019, the entire disclosure of which is incorporated by reference herein.

BACKGROUND

The present disclosure relates generally to a building management system and more particularly to identifying domain entities of the building management system from text. The present disclosure relates specifically to a building management system that is configured to identify the domain entities based on data specific to a particular building management system.

SUMMARY

Autonomous Natural Language Processing

One implementation of the present disclosure is a method for identifying entities from a text segment in a building management system (BMS). The method may include storing, by a processing circuit, a database of entity data associated with the BMS, at least a portion of the entity data including a plurality of stored entities; receiving, by the processing circuit, a text segment including one or more strings, the one or more strings identifying one or more entities; separating, by the processing circuit, the text segment into one or more chunks based on parts of speech of words of the one or more strings; identifying, by the processing circuit, a candidate entity from the one or more chunks; comparing, by the processing circuit, the candidate entity to the plurality of stored entities in the database; determining, by the processing circuit, one or more matching entities of the plurality of stored entities based on a similarity score between the candidate entity and each of the plurality of stored entities exceeding a threshold; selecting, by the processing circuit, a domain entity from the one or more matching entities; and transmitting, by the processing circuit, an identification of the domain entity to a computing device.

In some embodiments, the candidate entity is associated with characteristics, the characteristics including context or linguistic information of the text segment identifying the candidate entity.

In some embodiments, the method includes determining an entity type of the candidate entity based on the characteristics.

In some embodiments, the method includes determining that there is not a matching entity with a similarity score between the candidate entity and one or more of the stored entities that exceeds the threshold; and tagging, by the processing circuit, the candidate entity with a tag indicating that the candidate entity is not associated with a matching entity.

In some embodiments, selecting a domain entity from the one or more matching entities includes receiving, by the processing circuit, an input identifying the domain entity from the one or more matching entities.

In some embodiments, the domain entity is representative of a space or a building device of the building management system.

In some embodiments, the method includes determining, by the processing circuit, that a second similarity score between the candidate entity and a third entity of the one or more matching entities exceeds a second threshold; and selecting, by the processing circuit, the third entity based on the second similarity score exceeding the second threshold.

In some embodiments, text segment includes one or more words. Separating the text segment into one or more chunks may include tagging each word of the one or more words of the text segment with a tag identifying a part of speech; comparing the tags of each word of the one or more words to a plurality of patterns, each pattern identifying a chunk; determining one or more patterns of the plurality of patterns that match the tags; and separating the one or more words into chunks based on tags of the one or more words matching the patterns.

In some embodiments, the computing device includes a natural language service and the method further includes training the natural language service with the identification.

Incident Management with Brick and Natural Language Processing

One implementation of the present disclosure is a method for identifying and managing incidents in a building management system (BMS) of a building. The method may include identifying, by a processing circuit, at least one or more entities, one or more intents, or one or more keywords from a text segment; extracting, by the processing circuit, one or more parameters from at least one of the identified one or more entities, the identified one or more intents, or the identified one or more keywords, the one or more parameters including a piece of building equipment of the building and a characteristic of the piece of building equipment; determining, by the processing circuit, a satisfied incident of a plurality of incidents based on the extracted one or more parameters, the satisfied incident identifying an issue with the piece of building equipment and associated with a second entity; and transmitting, by the processing circuit, an indication of the satisfied incident to a computing device of the second entity.

In some embodiments, identifying the at least one or more entities, the one or more intents, or the one or more keywords from the text segment includes separating the text segment into one or more chunks based on parts of speech of words of the text segment; and identifying one or more entities or one or more intents from the one or more chunks.

In some embodiments, extracting the one or more parameters includes comparing the one or more keywords, the one or more entities, or the one or more intents to a database, the database storing incident data including data associated with previous incidents in the BMS; identifying a matching keyword, a matching entity, or a matching intent based on the comparison; and extracting the one or more parameters based on the identified matching keyword, the identified matching entity, or the identified matching intent.

In some embodiments, the one or more entities include a piece of building equipment, a space within the building, or a building identifier of the building.

In some embodiments, determining the satisfied incident includes comparing the extracted parameters to one or more templates; determining that the extracted parameters satisfy a template of the one or more templates; and determining the satisfied incident based on the extracted parameters satisfying the template of the one or more templates.

In some embodiments, the characteristic includes a condition of the piece of building equipment or a type of the piece of building equipment.

In some embodiments, the text segment is a first segment, the method further includes displaying, by the processing circuit, a graphical user interface to a user, the graphical user interface including a field for receiving a text input including a building equipment issue description; and receiving, by the processing circuit and via the graphical user interface, a second text segment as an input into the field for receiving a text input. Determining the satisfied incident is further based on the second text segment.

In some embodiments, the method further includes receiving the first text segment from a transcription service.

In some embodiments, the method further includes receiving, by the processing circuit, an image of the piece of building equipment; and determining, by the processing circuit, image features based on the image, the image features identifying the piece of building equipment and characteristics of the piece of building equipment. Determining the satisfied incident may be further based on the determined image features of the piece of building equipment.

In some embodiments, the method may further include determining, by the processing circuit, an incident priority based on the extracted one or more parameters; and determining, by the processing circuit, the second entity based on the determined incident priority.

In some embodiments the satisfied incident is associated with a plurality of second entities. The method may further include storing, by the processing circuit for a template of the satisfied incident, a counter for each of the plurality of second entities, each counter having a count identifying the number of times the respective second entity has resolved the an incident having the same incident type as the satisfied incident associated with the template; comparing, by the processing circuit, the counts associated with each of the second entities; and selecting, by the processing circuit, the second entity responsive to the second entity being associated with the highest count of the plurality of second entities.

In another implementation of the present disclosure, a building system for identifying and managing incidents in a building management system (BMS) of a building is described. The building system may include one or more memory devices configured to store instructions thereon that, when executed by one or more processors, cause the one or more processors to identify at least one or more entities, one or more intents, or one or more keywords from a text segment; extract one or more parameters from at least one of the identified one or more entities, the identified one or more intents, or the identified one or more keywords, the one or more parameters including a piece of building equipment of the building and a characteristic of the piece of building equipment; determine a satisfied incident of a plurality of incidents based on the extracted one or more parameters, the satisfied incident identifying an issue with the piece of building equipment and associated with a second entity; and transmit an indication of the satisfied incident to a computing device of the second entity.

In some embodiments, the instructions cause the one or more processors to identify the at least one or more entities, the one or more intents, or the one or more keywords from the text segment by separating the text segment into one or more chunks based on parts of speech of words of the text segment; and identifying one or more entities or one or more intents from the one or more chunks.

In some embodiments, the instructions cause the one or more processors to extract the one or more parameters by comparing the one or more keywords, the one or more entities, or the one or more intents to a database, the database storing incident data including data associated with previous incidents in the BMS; identifying a matching keyword, a matching entity, or a matching intent based on the comparison; and extracting the one or more parameters based on the identified matching keyword, the identified matching entity, or the identified matching intent.

In some embodiments, the one or more entities include a piece of building equipment, a space within the building, or a building identifier of the building.

In some embodiments, the instructions cause the one or more processors to determine the satisfied incident by comparing the extracted parameters to one or more templates; determining that the extracted parameters satisfy a template of the one or more templates; and determining the satisfied incident based on the extracted parameters satisfying the template of the one or more templates.

In some embodiments, the characteristic includes a condition of the piece of building equipment or a type of the piece of building equipment.

In yet another implementation of the present disclosure a method for identifying and managing incidents in a building management system (BMS) of a building is described. The method may include identifying, by a processing circuit, at least one or more entities, one or more intents, or one or more keywords from a text segment; identifying, by the processing circuit, at least one feature from an image of a piece of building equipment of the building; extracting, by the processing circuit, one or more parameters from at least one of the identified one or more entities, the identified one or more intents, or the identified one or more keywords, the one or more parameters including the piece of building equipment of the building and a characteristic of the piece of building equipment; determining, by the processing circuit, a satisfied incident of a plurality of incidents based on the extracted one or more parameters and the at least one feature from the image, the satisfied incident identifying an issue with the piece of building equipment and associated with a second entity; and transmitting, by the processing circuit, an indication of the satisfied incident to a computing device of the second entity.

In some embodiments, identifying the at least one or more entities, the one or more intents, or the one or more keywords from the text segment includes separating the text segment into one or more chunks based on parts of speech of words of the text segment; and identifying one or more entities or one or more intents from the one or more chunks.

In some embodiments, extracting the one or more parameters includes comparing the one or more keywords of the text segment, the one or more entities, or the one or more intents to a database, the database storing incident data including data associated with previous incidents in the BMS; identifying a matching keyword, a matching entity, or a matching intent based on the comparison; and extracting the one or more parameters based on the identified matching keyword, the identified matching entity, or the identified matching intent.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 21 is a graphical user interface including an incident ticket screen that a user can use to report an incident and an active incidents screen, according to an exemplary embodiment.

DETAILED DESCRIPTION

Autonomous Natural Language Processing

Figure 1:
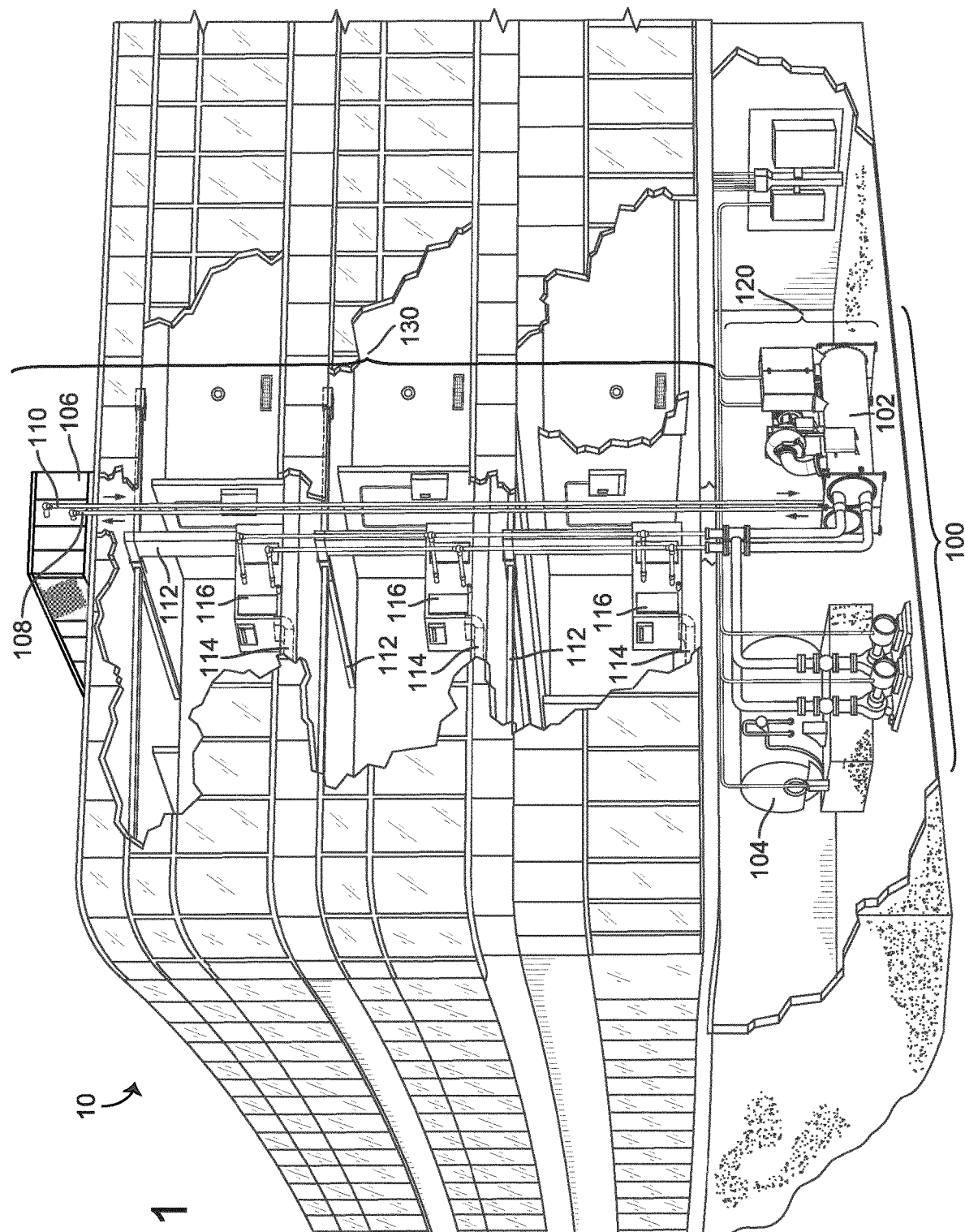
FIG. 1 is a drawing of a building equipped with a heating, ventilating, or air conditioning (HVAC) system and a building management system (BMS), according to an exemplary embodiment.

In a speech recognition system (e.g., Natural language processing (NLP)), speech is converted to text using standard transcription techniques. The text is sent to cognitive services for intent and entity detection. The intent may be an intention of the speech and the entity may be the subject of the speech (e.g., a space or a building device) or modify the intents. Unfortunately, standard transcription techniques do not always generate accurate text. This can be an issue when determining which domain entity of a building management system speech is referring to when asking questions about the domain entity or directing the domain entity to change configurations or states. For example, a transcription service may transcribe the words "Building 1" from speech asking questions about the current temperature inside building 1. The intended domain entity for the words may be associated with or labeled as "Building #01" or "Building—01." Consequently, a data processing system of the building management system may not accurately identify the transcribed words of Building 1 as being associated with Building #01 or building—01 and may provide an error to a user that provided the speech data (e.g., spoke). Furthermore, in some instances, the domain entities may be associated with words or phrases specific to the building management system. Consequently, commercial speech recognition systems may not be able to adapt without a significant amount of training, which is often done manually and can be expensive.

The present solution described herein provides for a system and method for predicting correct entities and intents of voice data that is provided to a data processing system. The data processing system can identify intents and entities from generated (e.g., transcribed) text by chunking words of the voice data and comparing words of the chunks to a custom library generated based on administrator suggestions specific to the building management system. The data processing system can identify stored entities within a database of the data processing system that have the highest similarity scores and determine the entities that match the text based on the similarity scores and/or rankings of the stored entities. The data processing system can rank the stored entities based on a number of times the stored entities are matched with entities of text segments and/or selected to be associated with a text segment. Once the data processing system selects a stored entity based on the text segment, the data processing system can modify the text segment with the selected stored entity so the text segment can be in a correct form for the building management system. The data processing system can train language processing services based on the selected stored entity by providing the language processing services with the input text segment and the output selected stored entity. Further, the data processing system can identify intents of the text segment using similar methods and send the intents to the language processing services for training as well.

Incident Management with Brick and Natural Language Processing (NLP)

A large percentage of the population or workforce spends a large amount of time working in offices within office buildings. Unfortunately, the office buildings may experience issues with their building management systems that can cause a downturn in work as employees are forced to take time off while technicians fix the issues. The issues may be caused for various reasons such as bad maintenance, power fluctuations, and many other reasons. It can be important to report the issues as quickly and as easily as possible so a technician can identify the problem and solve it before the problem gets worse. If the technician is experienced and identifies the problem early, the technician may solve the problem quickly so operation of the office building may continue with little, if any, downturn in work done by the employees. Thus, there is a need for a smart incident management solution which can help users report issues and automate certain processes to avoid human intervention and delays.

The present disclosure is directed to systems and methods for resolving incidents quickly to restore services in a building back to normal quickly and mitigate any adverse effects of critical incidents on business operations. The systems and methods provide users with a system for managing incidents by automatically identifying incidents or issues that may occur in a building system and determining the best technician to resolve the incident. The system can log incidents, assign incidents to a technician, classify incidents based on urgency of the incidents, notify users who logged the incidents, and generate reports tracking and analyzing incidents to identify common incidents and areas of potential improvement. The incidents or issues that occur may be resolved quickly and efficiently based on the best technician resolving the incident.

Furthermore, in instances in which users attempt to report any incidents that they are experiencing in a building management system, the users may not be able to accurately or adequately describe the problems that they are experiencing to an operator or in an incident ticket. Building systems not implementing the systems and methods described herein may not be able to determine the issues that are causing the users discomfort based on the partial description because the building systems do not have a way of doing so without having a full description or a description that specifically identifies the issue. By implementing the systems and methods described herein, however, a building system may determine a particular incidents that users experience based on such partial descriptions. The building system may do so by identifying entities, intents, keywords, and/or contexts of a spoken and/or written utterance of a partial description and comparing them to a preset template associated with a particular incident. Because the template may be satisfied without each criteria of the template being met, the building system can determine the template is satisfied without a full description of the incident and identify the incident based on the satisfied template.

Building Management System

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
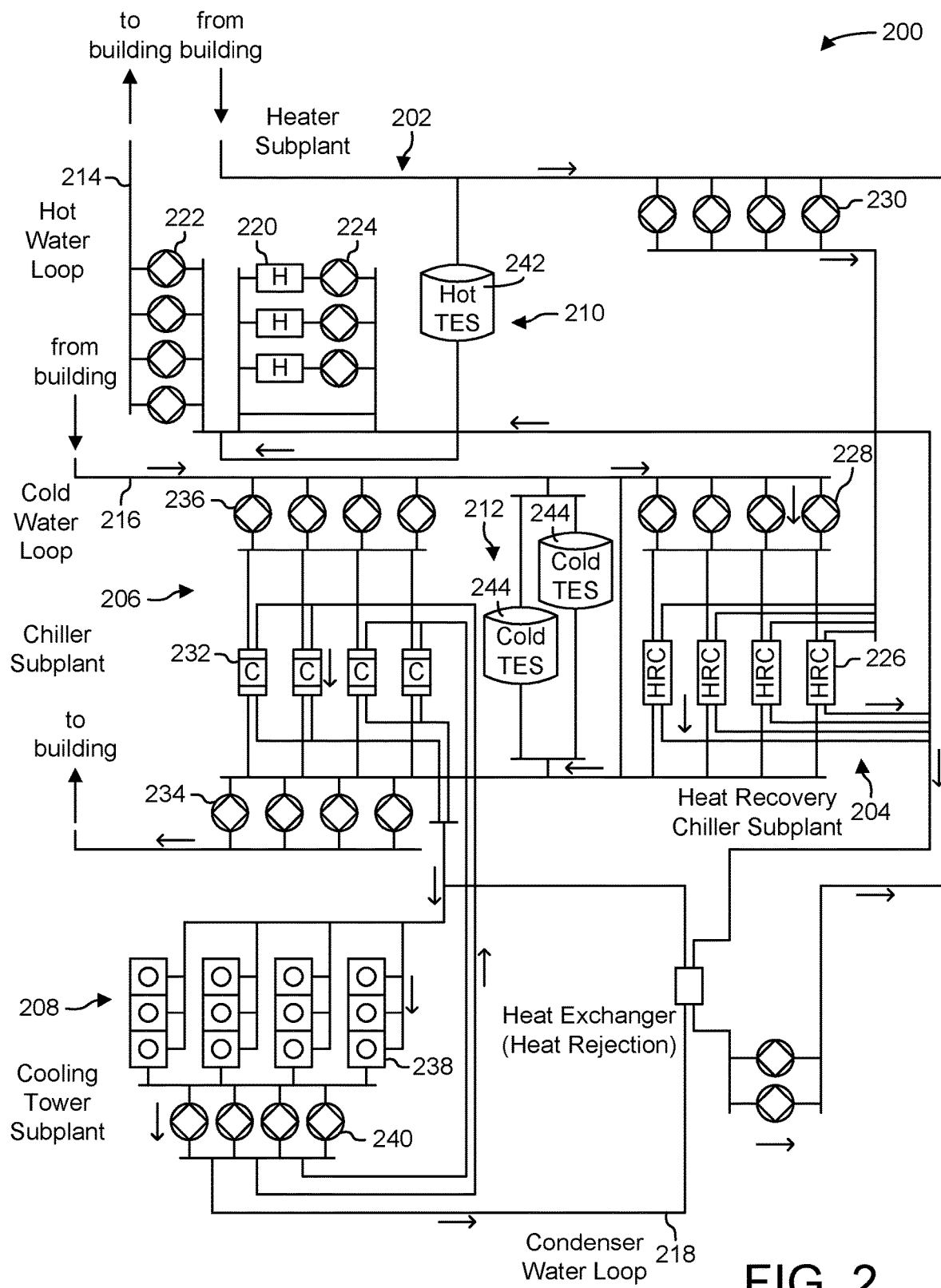
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
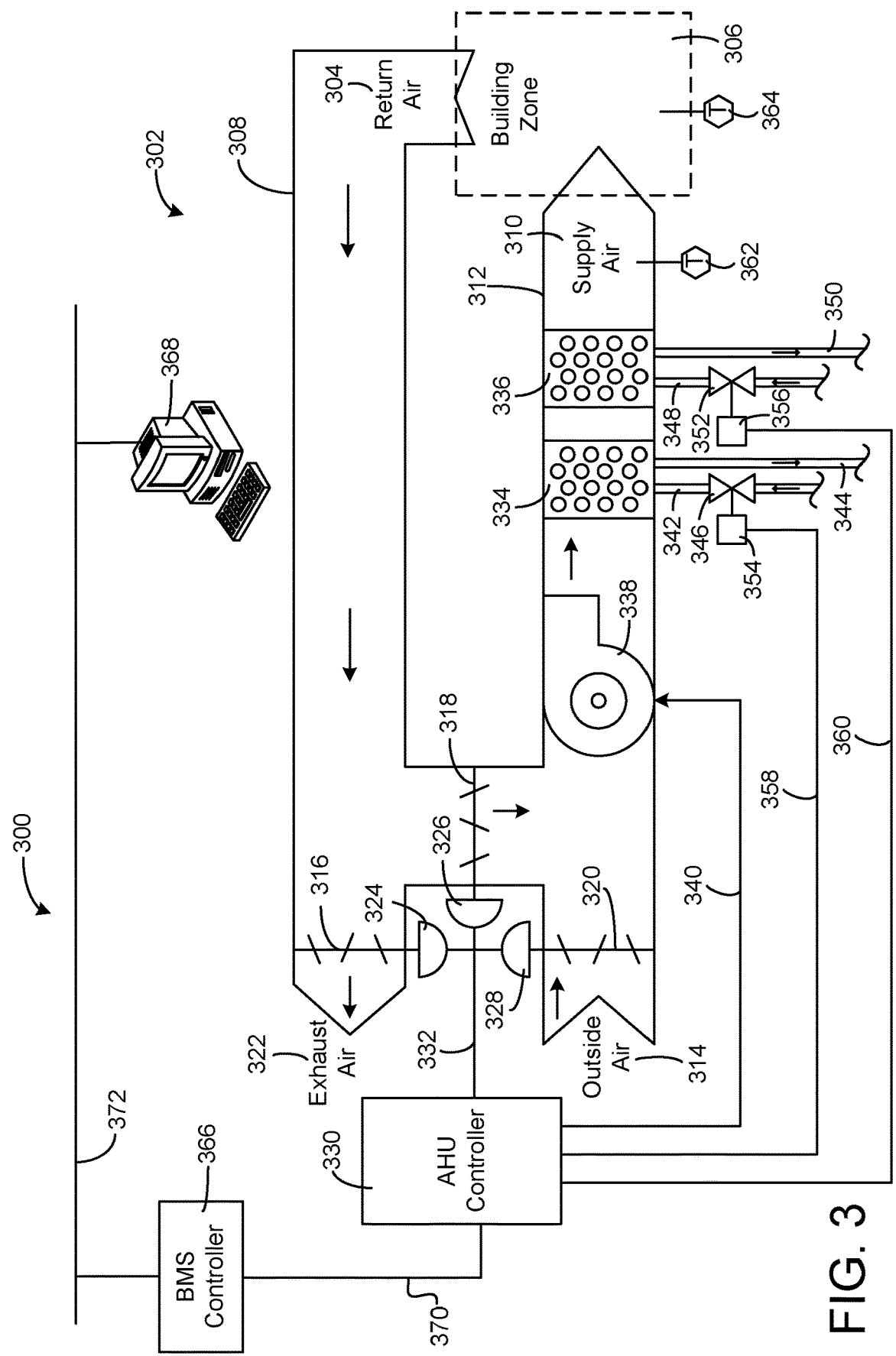
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
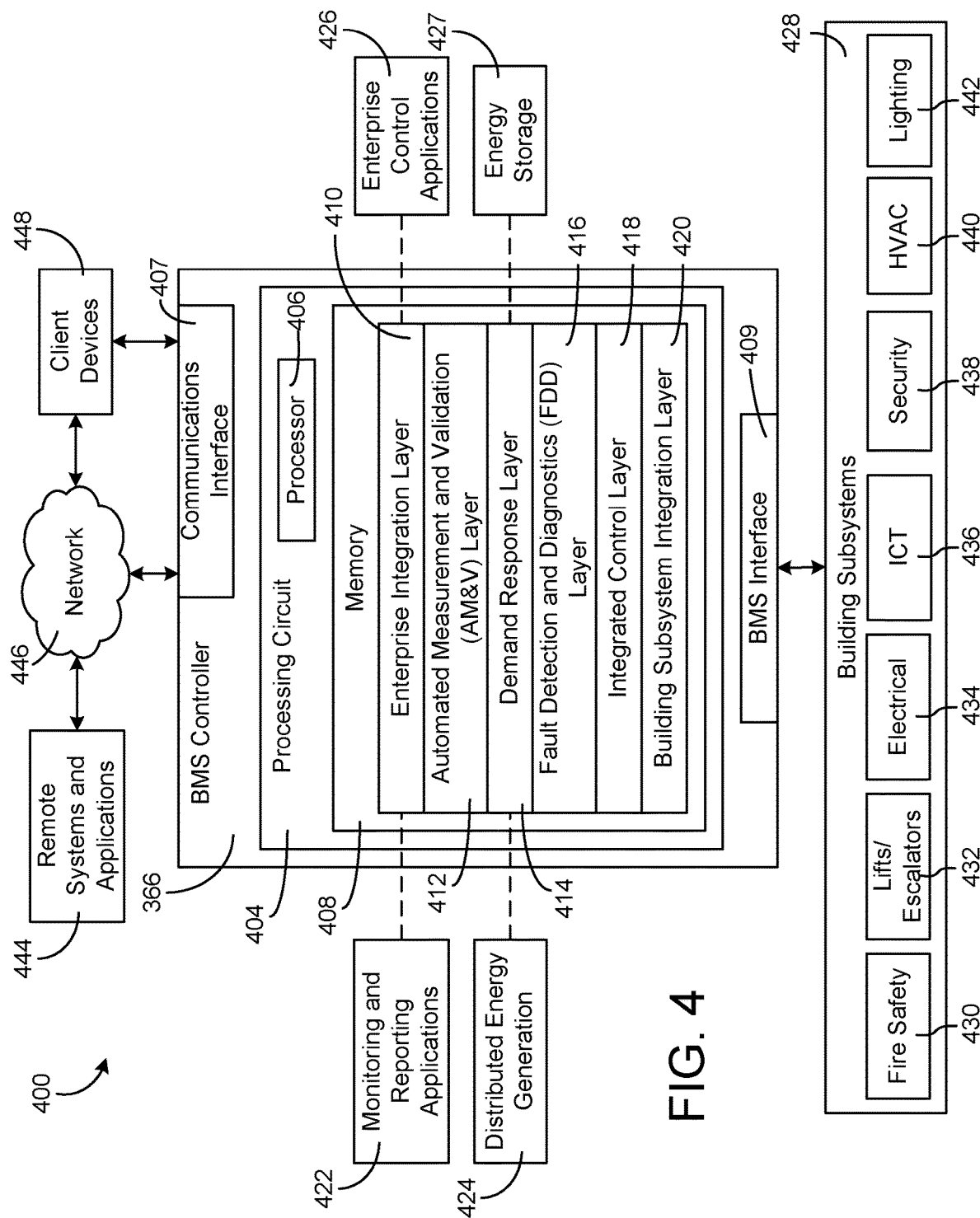
FIG. 4 is a block diagram of a BMS which may be implemented in the building of FIG. 1, according to an exemplary embodiment.

Referring now to FIG. 4, a block diagram of a BMS 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a WiFi transceiver for communicating via a wireless communications network. In another example, one or more of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Building Management System with Autonomous Natural Language Processing

Figure 5:
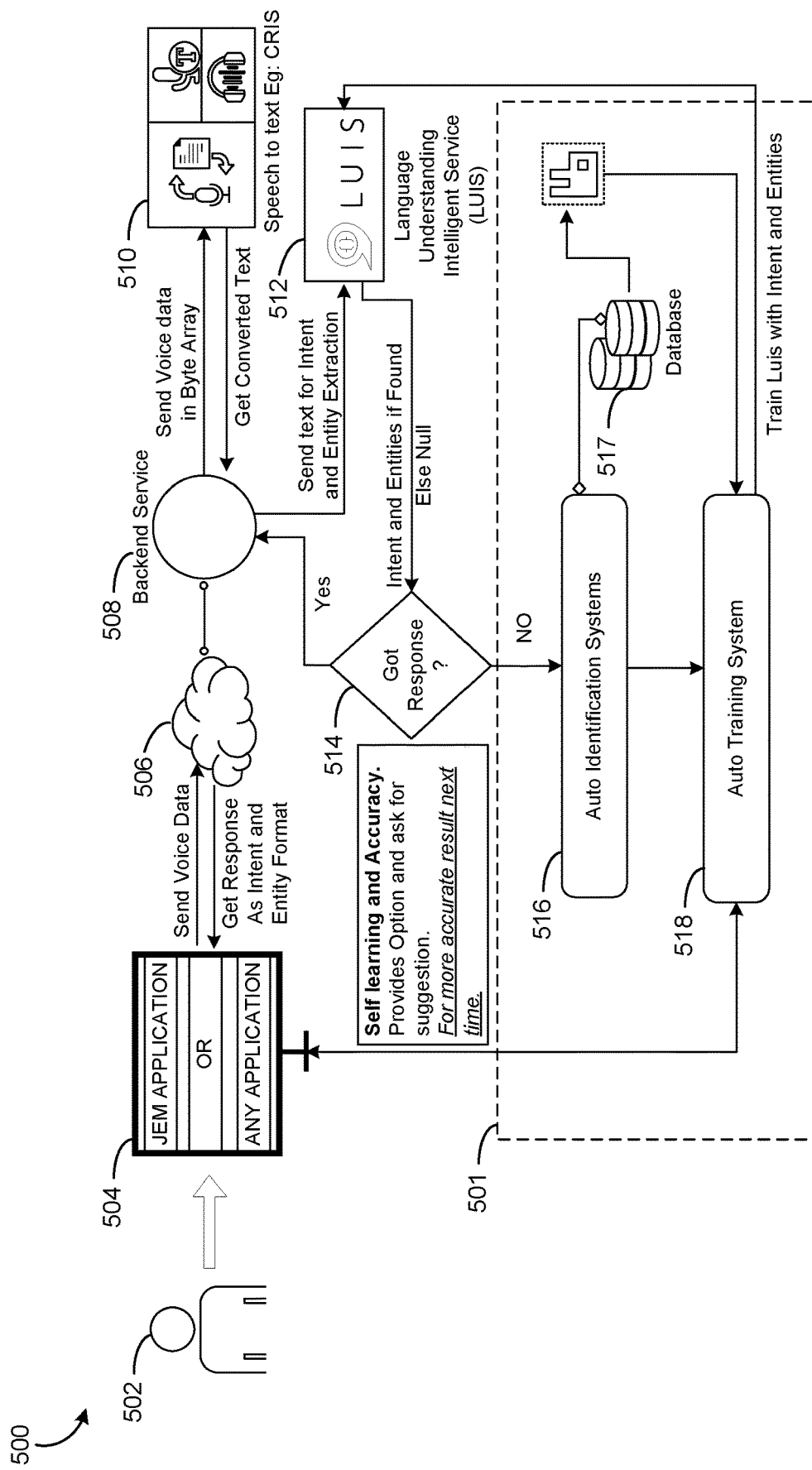
FIG. 5 is a flow diagram of a process for using a natural language processing system to select a domain entity based on a candidate entity identified from a text segment and training a language processing service with the selected entity, according to an exemplary embodiment.

FIG. 5 is a flow diagram of a process 500 for using a natural language processing system to select a domain entity (e.g., an entity representative of a building or space) of a building management system (e.g., building management system 400). The natural language processing system can select the domain entity based on a candidate entity identified from a text segment and train a language processing service with the selected domain entity, according to an exemplary embodiment. At a step 502, an administrator can access a computing device. The administrator can provide voice data to the computing device. In some instances, the voice data can be related to building management system 400. For example, the voice data can include the language "show me the power consumption details of 200 George Street." 200 George Street may be associated with building management system 400. At a step 504, the computing device can receive and access the voice data using an application. At a step 506, the computing device can use the application to send the voice data to a cloud service. The cloud service may include or be associated with a backend service that processes the voice data (e.g., stores).

At a step 508, the backend service can send the voice data in a byte array to a transcription service such as, but not limited to CRIS, Amazon Lex, Express Scribe, Trint, etc. At a step 510, the transcription service can transcribe the voice data into a text format. At a step 512, the transcription service can send the data in the text format to a language processing service to identify entities, intents, and other aspects of the text (e.g., identify what space or building device is referenced, the intent, and the context of the text). At a step 514, the language processing service can determine if it identified entities and/or intent from the text. If the language processing system identified entities and/or intents, the language processing service may send the identified entities and/or intent to the computing device in a machine-readable format. Continuing with the example above, the language processing service can identify the power consumption details and 200 George St. as entities and determine the voice data is a command based on the "Show me" language.

If the language processing service does not identify any entities or intents, at step 516, the language processing service can send the text to the auto-identification system of the natural language processing service. The auto-identification system can access a database 517 including stored entities that are associated with a building management system. The database can include information particular to the building management system. The auto-identification system can determine entities of the building management system (e.g., domain entities) and intents (e.g., intentions) of the text by comparing the text to stored entities and intents of the database. The auto-identification system can identify a stored entity with a highest similarity score to the entities of the text as the domain entity of the building management system that the text is referring to. Intents of the database can be selected using the same processes. The auto-identification system can send the text, the selected intent, and/or the selected domain entity to an auto-training system. In some instances, the auto-identification system and the auto-training system can be components of a computing system 501.

At step 518, the auto-training system can train the language processing system with the selected domain entity, selected intent, and the text. The auto-training system can send an identification to the language processing system including the text and the selected intent and/or domain entity. The language processing system can receive the identification and use the text as an input and the selected intent and domain entity as the tagged output to train an internal machine learning model of the language processing system. The natural language processing system can adjust its internal processes (e.g., weights and other internal processes the language processing system uses to determine entities and intents of the text) based on the identification. The auto-training system can also send the output to the client device being accessed by the administrator. The administrator may view the selected domain entity and intent and determine if they are correct. If they are not correct, the auto-training system may not use the data to train the language processing system. In some instances, the administrator may indicate a correct domain entity and intent to associate with the text and train the language processing system by inputting the correct domain entity and intent.

Figure 6:
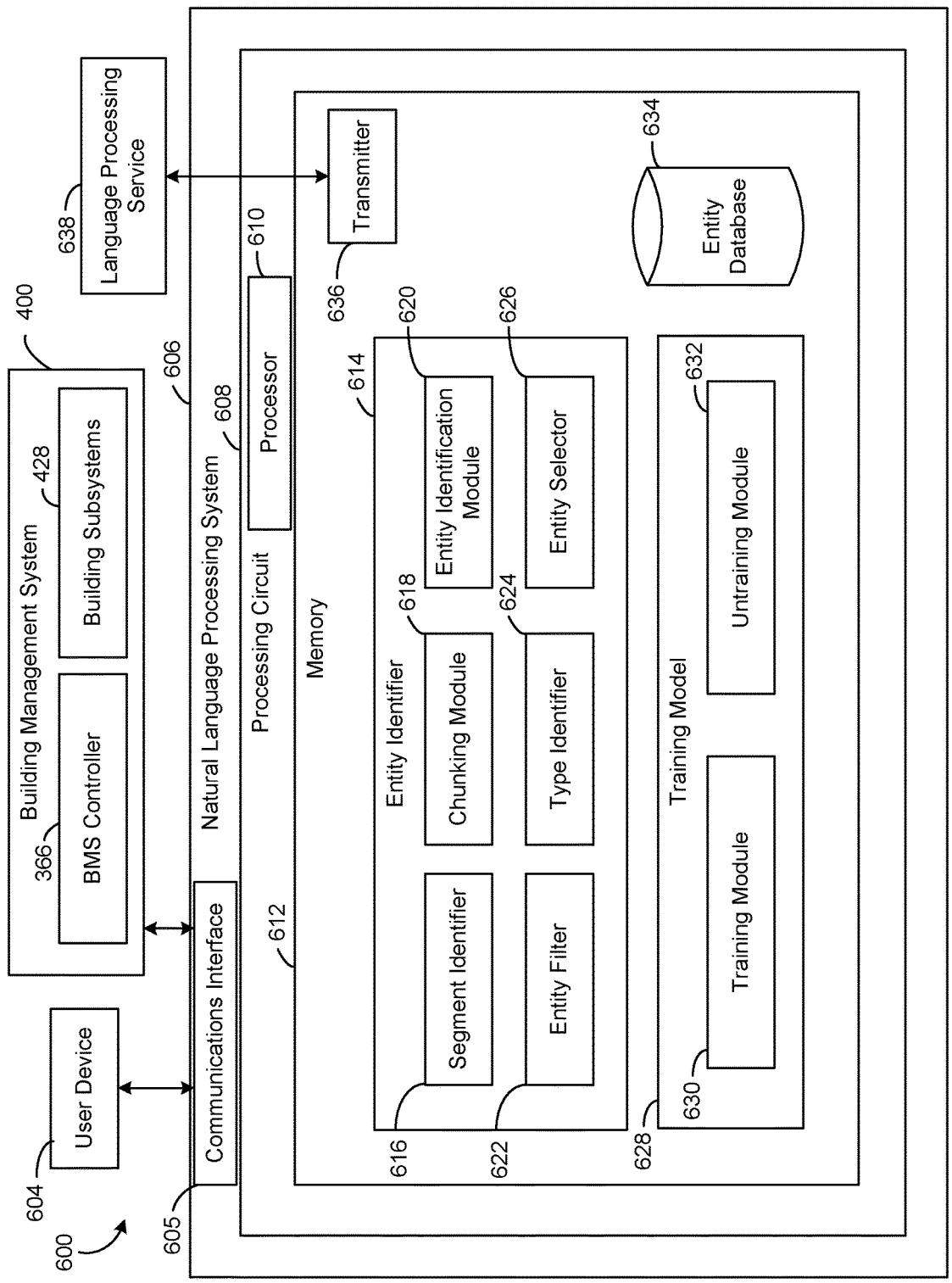
FIG. 6 is a block diagram of a cloud implemented natural language processing system for selecting a domain entity based on a candidate entity identified from a text segment, according to an exemplary embodiment.

Referring now to FIG. 6, a block diagram of a natural language processing system 606 connected to building management system 400, a user device 604, and a language processing service 638 is shown, according to an exemplary embodiment. Natural language processing system 606 can be configured to receive and identify transcribed text segments from language processing service 638. Natural language processing system 606 can identify candidate entities (e.g., spaces or building devices of building management system 400) from the transcribed text segments. In some embodiments, natural language processing system 606 can also be configured to generate a graphical user interface to user device 604 displaying stored entities that natural language processing system 606 determined may match the candidate entities based on the stored entities exceeding a similarity score threshold. Natural language processing system 606 can also use a classification hierarchy to select an entity that matches the candidate entity. Natural language processing system 606 is shown to include a processing circuit 608 that includes a processor 610 and a memory 612. Memory 612 can include instructions which, when executed by processor 610, cause processor 610 to perform the one or more functions described herein. Each of the processes and services conducted by natural language processing system 606 can also be conducted by BMS controller 366. In some embodiments, each of the processes and services conducted by natural language processing system 606 can be conducted in a cloud, a separate server, or any other computing device.

Natural language processing system 606 is shown to include a communications interface 605. Communications interface 605 can be configured to facilitate communication with any device. Furthermore, communications interface 605 can be configured to communicate with all of the devices and systems described with reference to FIG. 3. In various embodiments, communications via communications interface 605 can be direct (e.g., local wired or wireless communications) or via a communications network (e.g., a WAN, the Internet, a cellular network, etc.). For example, communications interface 605 can include an Ethernet card and port for sending and receiving data via an Ethernet-based communications link or network. In another example, communications interface 605 can include a Wi-Fi transceiver for communicating via a wireless communications network. In another example, communications interface 605 can include cellular or mobile phone communications transceivers. In one embodiment, communications interface 605 is a power line communications interface. In some embodiments, communications interface 605 is an Ethernet interface.

In addition to a traditional processor and memory, processing circuit 608 may include integrated circuitry for processing and/or control, e.g., one or more processors and/or processor cores (e.g., microprocessor and/or microcontroller) and/or FPGAs (Field Programmable Gate Array) and/or ASICs (Application Specific Integrated Circuitry). Processing circuit 608 can include and/or be connected to and/or be configured for accessing (e.g., writing to and/or reading from) the memory 612, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory).

Memory 612 can be configured to store code executable by control circuitry and/or other data, e.g., data pertaining to communication, e.g., configuration and/or address data of nodes, etc. Processing circuit 608 can be configured to implement any of the methods described herein and/or to cause such methods to be performed, e.g., by processor 610. Corresponding instructions may be stored in memory 612, which may be readable and/or readably connected to processing circuit 608. Memory 612 is shown to include an entity identifier 614 and a training model 628. Memory 612 can include any number of components and/or modules. Processing circuit 608 can implement any of components 614-634 to receive text segments and identify domain entities of building management system 400 that are associated with entities identified in the text segments. It may be considered that processing circuit 608 includes or may be connected or connectable to memory 612, which may be configured to be accessible for reading and/or writing by the controller and/or processing circuit 608. Further, components 614-634 of memory 612 can communicate with a user device 604 to receive and transmit data. User device 604 can be the same or similar to client devices 368 as described with reference to FIG. 3.

Entity identifier 614 may be configured to identify entities within building management system 400 from text segments that natural language processing system 606 receives. Entity identifier 614 is shown to include a segment identifier 616, a chunking module 618, an entity identification module 620, an entity filter 622, a type identifier 624, and an entity selector 626. Each of components 614-626 can act in concert to receive a text segment, identify candidate entities from the text segment, filter the candidate entities based on a frequency that the candidate entities have been identified, and select a domain entity associated with a candidate entity.

Training model 628 can be configured to train and untrain language processing services (e.g., language processing service 638) based on the entities that the entity identifier 614 selects and data associated with the entities. Training model 628 is shown to include training module 630 and untraining module 632. Training module 630 can be configured to train language processing service 638. Training module 630 can be configured to train language processing service 638 based on the domain entities that are selected by entity selector 626. Training module 630 can be configured to provide the selected domain entity and text segment to language processing service 638 in real-time as entity selector 626 selects domain entities associated with candidate entities from text segments. Untraining module 632 can be configured to receive a selection indicating for language processing service 638 to be untrained. Untraining module 632 can be configured to untrain language processing service 638 by bringing language processing service 638 back to a "zero-state," a state where language processing service 638 has not received any training data.

Via communications interface 605, entity database 634 can be configured to receive (collect) data such as entities. Entity database 634 can be a graph database, MySQL, Oracle, Microsoft SQL, PostgreSql, DB2, document store, search engine, device identifier-value store, etc. Entity database 634 is configured to hold any amount of data and can be made up of any number of components, in some embodiments. Entities stored in entity database 634 can be stored entities. Stored entities can be entities of building management system 400. The stored entities can be associated with data identifying a type of entity for each stored entity. Different types can include types of spaces such as hallways, kitchens, conference rooms, etc., and types of building equipment such as actuators, chillers, boilers, fan coils, etc. The stored entities can also be associated with different ways of spelling a name of the stored entity, common misspellings of the stored entity, and a phonetic spelling of the stored entity. For example, building #01 may be the spelling of a stored entity. The stored entity of building #01 may include meta data identifying a type (e.g., building), a list of other ways to spell building #01 (e.g., building 1 or building—01), common misspellings (e.g., bilding 1, billding 1, etc.), and/or a phonetic spelling (e.g., bil-ding). Further, entity database 634 may include information identifying a number of times each entity has been selected as a domain entity based on text segments that natural language processing system 606 has processed.

Natural language processing system 606 is shown to include transmitter 636, in some embodiments. Transmitter 636 can be configured to transmit an identification of an input text segment and the domain entity that natural language processing system 606 selects using the techniques described herein. The identification can include meta data about the input text segment and the domain entity such as the entity type of the domain entity, parts of speech of the words of the text segment, intents, context of the text segment (e.g., subject matter or tone), and/or any other linguistic characteristic of the text segment. The identification can be used by language processing service 638 for training specific to the domain of building management system 400. Transmitter 636 can transmit the identification to language processing service 638 when entity selector 626 selects the domain entity to be associated with the candidate entity of the text segment (e.g., selects the domain entity that a text segment is referencing).

Language processing service 638 can be a natural language processing service hosted on a client device or an internal device that automatically detects the meaning of language of text segments. Language processing service 638 may detect entities and intents. Language processing service 638 can be a commercial natural language processing service such as, but not limited to, Microsoft LUIS, API.AI, Amazon Lex, IBM Watson Conversation, Wit.ai, Recast, Snips, etc. When language processing service 638 is initially connected to natural language processing system 606 and to building management system 400 (not shown), language processing service 638 may not be trained or may be trained based on data that is not pertinent to building management system 400. Natural language processing system 606 can train language processing service 638 by transmitting the identifications including the input text segments and the output selected domains and intents to language processing service 638. Advantageously, the identifications that natural language processing system 606 transmits to language processing service 638 may be unique to building management system 400. Consequently, language processing service 638 can be trained based on identifications specific to building management system 400 and be more accurate when identifying entities and intents of transcribed language pertaining to building management system 400.

Figure 7:
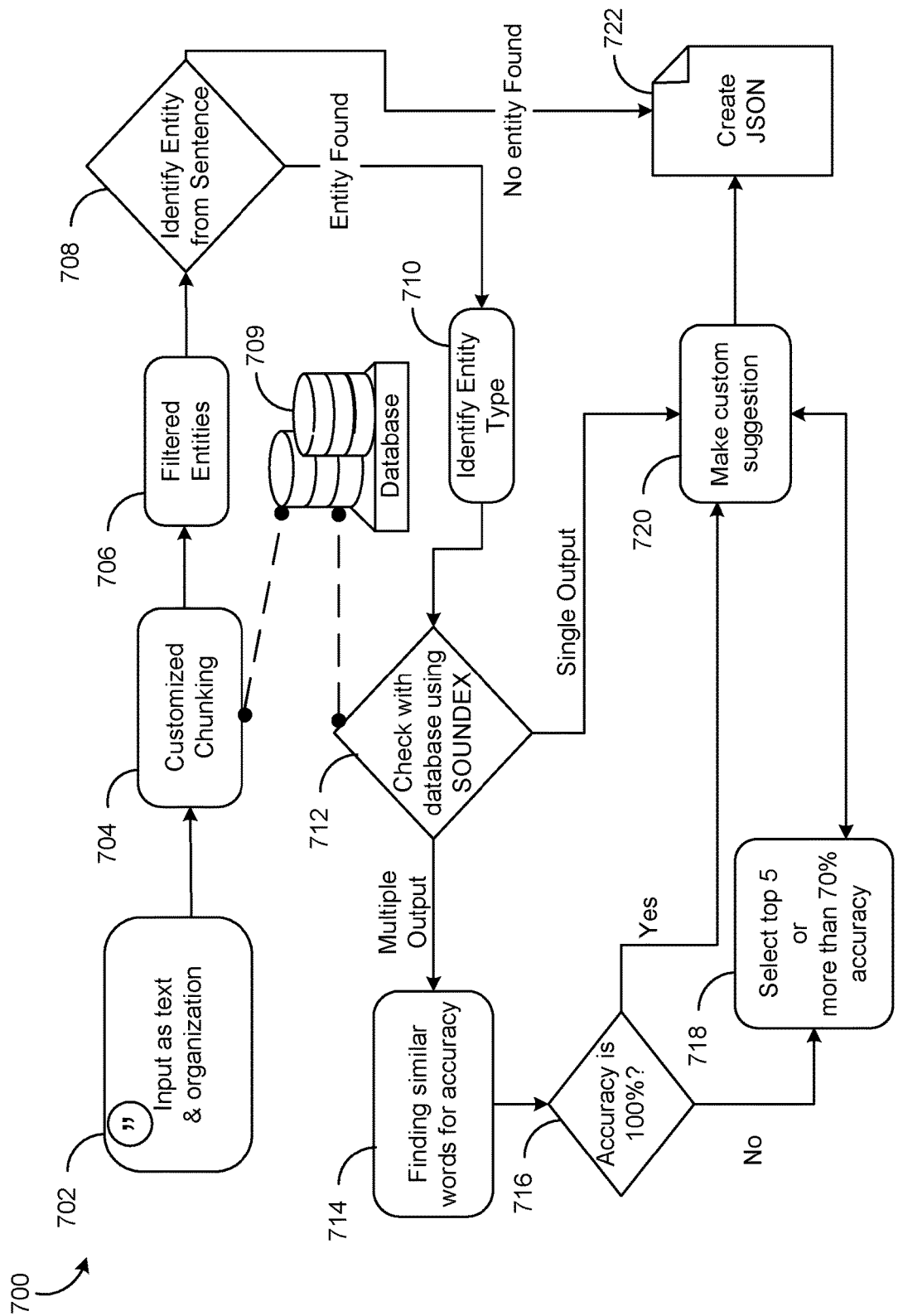
FIG. 7 is a flow diagram of a process for selecting a domain entity based on a candidate entity of the text segment, according to an exemplary embodiment.

Referring now to FIG. 7, a flow diagram of a process 700 for selecting a domain entity based on a candidate entity of the text segment is shown, according to an exemplary embodiment. Process 700 can be conducted by a data processing system (e.g., natural language processing system 606). At a step 702, the data processing system can receive an input including text and an organization (e.g., building management system) that is associated with the text. The organization can be an identification of which building management database to pull data to identify entities and intents from. At a step 704, the data processing system can separate words of the text into chunks based on the parts of speech of each word. At a step 706, the data processing system can filter entities extracted from the chunks to obtain entities that are likely being referenced in the text. At a step 708, the data processing system can identify candidate entities from the filtered entities. At a step 710, the data processing system can identify a type of each candidate entity (e.g., type of equipment or space). Candidate entities can be strings of words that the natural language processing system processes to select domain entities of the strings of words.

At a step 712, the data processing system can identify stored entities that match the sound of the candidate entity from a database 709 with entities specific to the building management system associated with the text segment. If the data processing system can only identify one match, at a step 720 the data processing system identify the matching entity as the domain entity. If the data processing system can identify multiple matching entities, at a step 714, the data processing system can identify words of the stored entities and compare the words to words of the candidate entities to determine similarity scores between the stored entities and the candidate entities. At a step 716, the data processing system can determine if a stored entity has a similarity score with the candidate entity exceeding a second threshold. If a stored entity has a similarity score that exceeds the second threshold, the data processing system can select the stored entity as the domain entity. Otherwise, at a step 718, the data processing system can identify a number of stored entities that exceed a first threshold. The data processing system can identify classifications of the number of stored entities and select the stored entity with the highest classification. Each of these steps will be described in greater detail below with reference to FIGS. 8-14.

Figure 8:
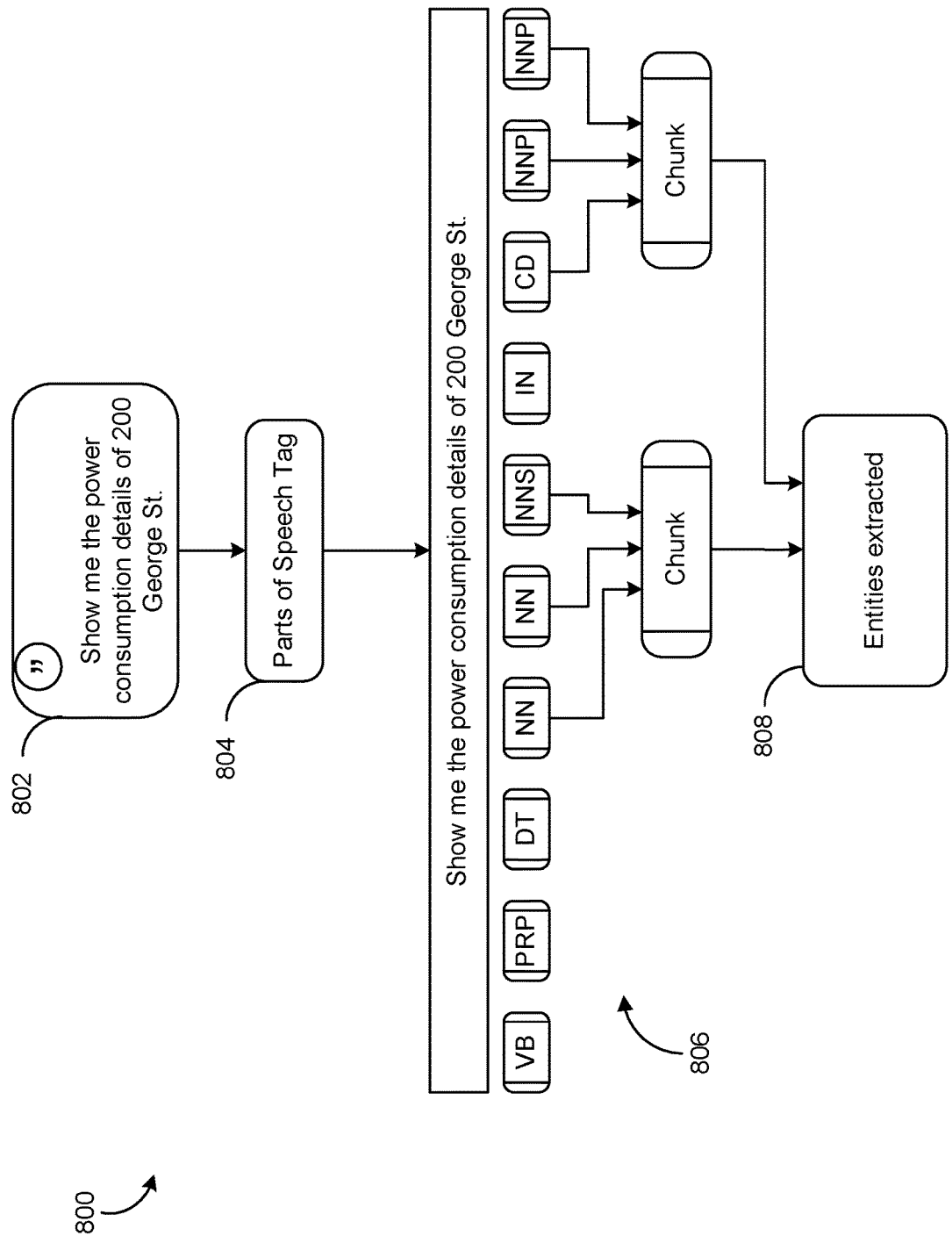
FIG. 8 is a flow diagram of a process for separating the text segment into chunks to identify candidate entities, according to an exemplary embodiment.

Referring now to FIG. 8, a flow diagram of a process 800 for separating a text segment into chunks based on parts of speech tags to identify candidate entities is shown, according to an exemplary embodiment. Process 800 can be conducted by a data processing system (e.g., natural language processing system 606). Process 800 may be conducted after process 700. At a step 802, the data processing system can receive an input including a string of words with the phrase "Show me the power consumption details of 200 George Str." The string of words may have been generated from voice data that was transcribed by a transcription service. In some cases, the input may be a transcribed command that an administrator speaks into an agent to obtain information about a building management system or to change a configuration of a building device of the building management system.

At a step 804, the data processing system may tag each word of the string of words with part of speech tags. The data processing system may tag each word by comparing the words with words in a database within the data processing system. The database may include a table with words mapped to part of speech tags. The data processing system can identify each word of the text and compare the words to the table to identify appropriate part of speech tags to apply to each word. Examples of part of speech tags include "VB" for verb, "NN" for noun, and "NNS" for plural nouns. There can be any number of parts of speech tags for any part of speech. Applying the tags to the phrase described above, the data processing system can tag the word "Show" with a VB tag, the words "power" and "consumption" with the NN tag, and the word "details" with the NNS tag.

At a step 806, the data processing system can group the words of the string of words into chunks. The data processing system can group the words into chunks based on part of speech tags of consecutive words matching a pattern. Any consecutive group of words that match the pattern may be grouped into a chunk. The pattern may be a template indicating an order in which the words must occur based on part of speech tags associated with the words for the template of the pattern to be satisfied. For example, a pattern may require two singular nouns to be followed by a plural noun for the pattern to be satisfied. In another example, a pattern may include noun phrases with any number of consecutive nouns and/or adjectives describing the nouns. For instance, the phrase "200 George St" includes an adjective and two consecutive nouns and the phrase "Building 1" includes a noun and an adjective, both phrases are noun phrases and may match a pattern. The data processing system can process the tags of a text string for a group of words that meets this criteria. If the data processing system can identify a group of words that meets the criteria of the pattern, the data processing system can group the words into a chunk. The pattern may be stored in a database within the data processing system. The database may store any number of patterns with templates that require words with parts of speech tags to occur in any order. The data processing system can apply each pattern of the database to the string of words to identify chunks.

At a step 808, the data processing system can extract candidate entities from the chunks. Candidate entities can be groups of words of each chunk of the text segments. Candidate entities can include some or all of the words of each chunk. The data processing system can identify multiple candidate entities from a text segment based on the text segment including multiple chunks.

Figure 9:
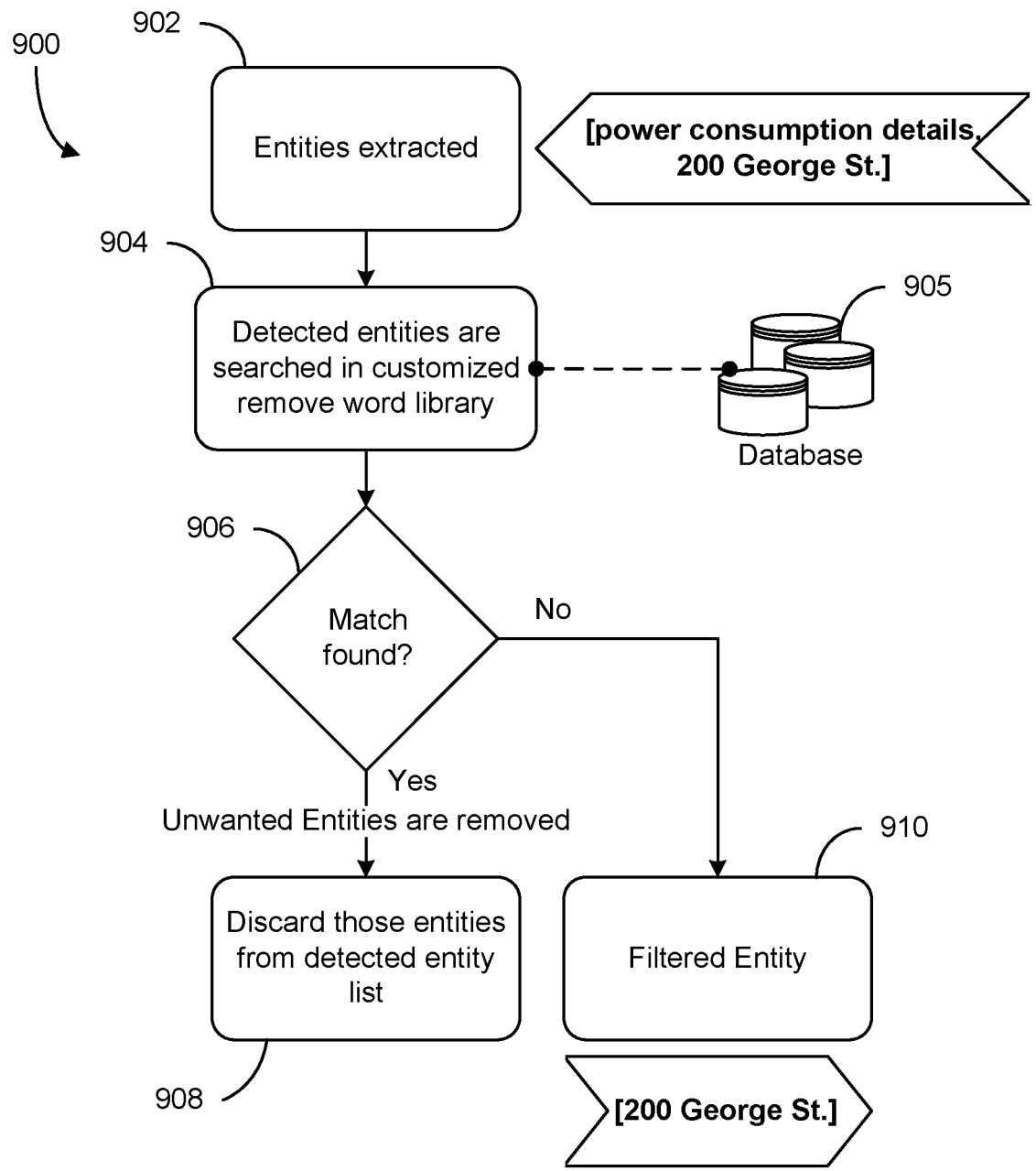
FIG. 9 is a flow diagram of a process for filtering candidate entities extracted from the text segment, according to an exemplary embodiment.

Referring now to FIG. 9, a flow diagram of a process 900 for filtering candidate entities extracted from the text segment is shown, according to an exemplary embodiment. Process 900 can be conducted by a data processing system (e.g., natural language processing system 606). Process 900 may be performed after process 800. At a step 902, the data processing system can identify the extracted candidate entities from the chunks of the text segment. At a step 904, the data processing system can detect candidate entities that have been tagged as a "remove word" candidate. The data processing system can detect candidate entities with the "remove word" tag by comparing the words of the candidate entities to a database 905 within the data processing system. The database may include a list of words tagged with the "remove word" tag. The data processing system may tag words or phrases with the "remove word" tag if the words or phrases have not been identified by the data processing system before or if the data processing system has not identified the word or phrase for a time period satisfying a predetermined threshold as set by an administrator.

At a step 906, the data processing system can determine if any of the candidate entities identified from the text segment are a match with words on the "remove word" list of the database or words with the remove word tag. If the data processing system identifies such a candidate entity, at step 908, the data processing system can discard (e.g., remove) the matching candidate entities from a list of candidate entities identified from the text segment. At a step 910, the data processing system can identify the candidate entities that were not discarded or removed from the list of candidate entities.

For example, the data processing system can identify two candidate entities, one candidate entity including the words "power consumption details" and another candidate entity including the words "200 George St." The data processing system can compare the words of each candidate entity to the remove word list of the database within the data processing system and determine that the candidate entity including the words power consumption details appears on the list. The data processing system can discard the candidate entity and keep the candidate with the words 200 George St on the list of candidate entities.

Figure 10:
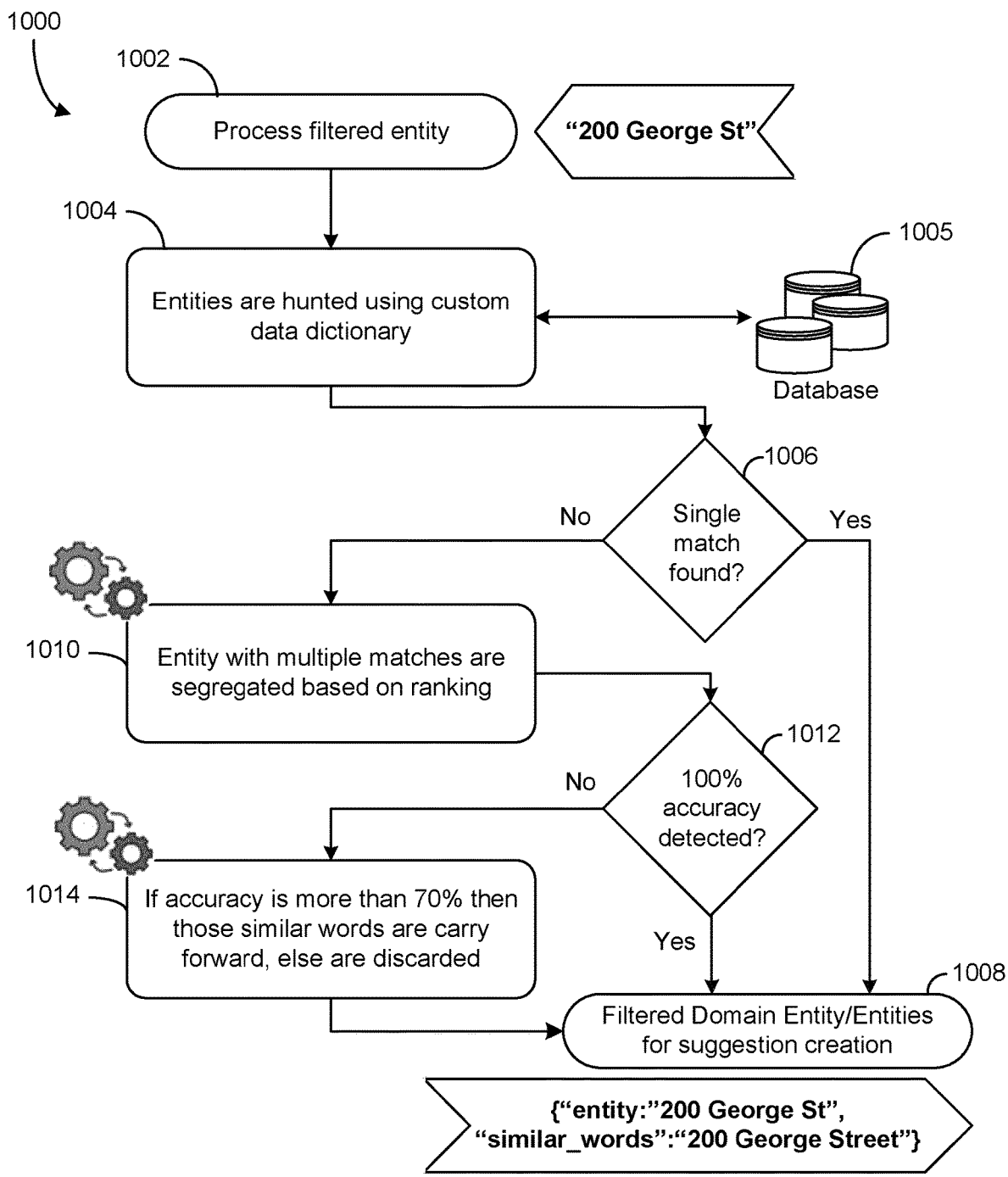
FIG. 10 is a flow diagram of a process for selecting the domain entity based on the domain entity matching the candidate entity, according to an exemplary embodiment.

Referring now to FIG. 10, a flow diagram of a process 1000 for selecting a domain entity based on the domain entity matching the candidate entity is shown, according to an exemplary embodiment. Process 1000 can be conducted by a data processing system (e.g., natural language processing system 606). Process 1000 may be performed on text segment 1001 after process 900. At a step 1002, the data processing system may identify candidate entities on the list of candidate entities identified in process 900. At a step 1004, the data processing system may compare the words of the candidate entities to words in a database 1005 (e.g., entity database 634) identifying different domain entities and information about the domain entities. The data processing system may compare the spelling of the words of the candidate entities with the spelling of stored entities in the database and the phonetic spelling of the candidate entities with the phonetic spelling of the stored entities. The data processing system can determine similarity scores between the candidate entities and each stored entity of the database based on how close the spellings and phonetic spelling are between them. The data processing system can determine a similarity score to be high if the all of or most of the spelling and/or phonetic spelling between a candidate entity and a stored entity match (e.g., are the same) and a low similarity if the spellings and/or phonetic spelling do not have many matches. The data processing system can determine similarity scores between the candidate entity and each stored entity in the database.

At a step 1006, the data processing system can compare the similarity scores between the candidate entities and the stored entities to a first threshold (e.g., 70%). Any stored entity with a similarity score that exceeds the first threshold can be considered a match. The data processing system can aggregate a list of matches for each candidate entity. If the data processing system only identifies one matching stored entity, at step 1008, the data processing system may output the matching stored entity to a computing device and/or natural language processing system for training.

If the data processing system can identify more than one match, at step 1010, the data processing system can rank the matching stored entities based on a ranking associated with each stored entity. Each stored entity may be ranked based on a number of times the stored entity has been selected by the data processing system to be associated with a candidate entity of a text segment. In some instances, the more a stored entity is selected to be associated with candidate entities in relation to other stored entities, the higher the rank of the stored entity. The stored entities may be ranked based on any criteria. The data processing system may change the ranking of the stored entities as time goes on and the data processing system selects more stored entities to be associated with candidate entities. The ranking of the stored entities may increase, decrease, or remain the same as the data processing system processes more text segments.

At a step 1012, the data processing system can determine if a candidate entity has a similarity score above a second threshold (e.g., 99%) with any stored entities. If the data processing system identifies a stored entity with a similarity score above the second threshold, the data processing system may select the stored entity regardless of the ranking of the stored entity or the rankings of other stored entities with similarity scores above the first threshold. Otherwise, the data processing system may select the stored entity with a similarity score that exceeds the first threshold and that has the highest ranking. In some embodiments, instead of relying on rank to select a stored entity, at a step 1014, the data processing system can identify the stored entities with the similarity scores above the first threshold and send them to a user interface for an administrator to select the correct stored entity based on the candidate entity of the input text segment. The data processing system may also select a stored entity with a highest similarity score to be the domain entity.

Figure 11:
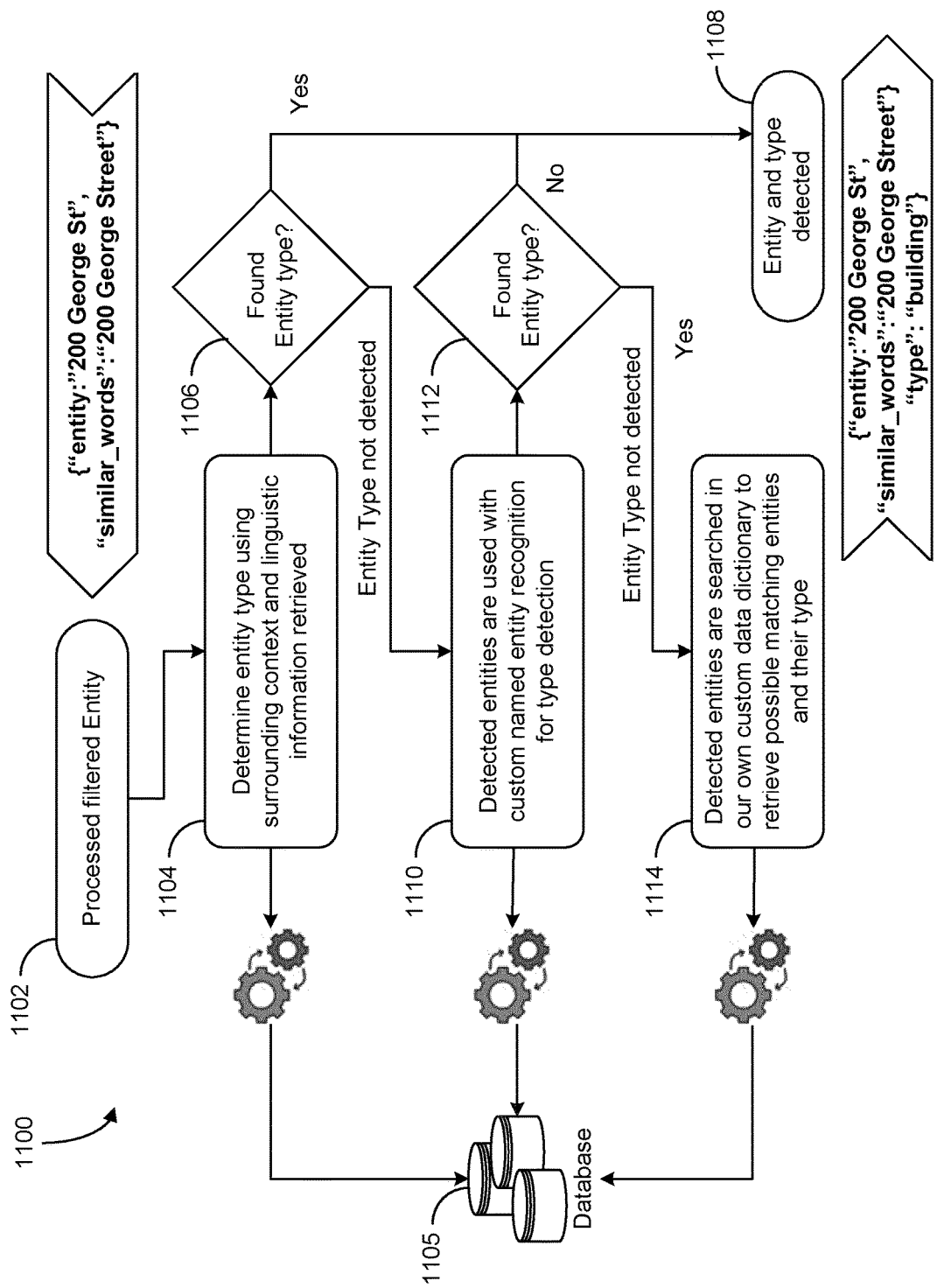
FIG. 11 is a flow diagram of a process for determining an entity type of the selected domain entity, according to an exemplary embodiment.

Referring now to FIG. 11, a flow diagram of a process 1100 for determining an entity type of the selected entity is shown, according to an exemplary embodiment. Process 1100 may be conducted by a data processing system (e.g., natural language processing system 606). Process 1100 may be performed after process 1000. At a step 1102, the data processing system may identify the selected entity. Continuing with the examples above, the data processing system can identify the selected entity for the candidate entity of 200 George St to be 200 George Street based on a similarity score between the entities exceeding a threshold. At a step 1104, the data processing system may determine an entity type using surrounding context and linguistic information that the data processing system retrieves from the text segment of the selected entity. An entity type may be the type of building device or space of the selected entity. For example, the entity type of 200 George St may be a building. Other entity types may be types of building equipment such as actuators, dampers, fans, boilers, chillers, etc., and types of spaces such as hallways, kitchens, conference rooms, offices, etc.

The data processing system may identify the entity type of the domain entity by parsing the text segment to identify context and linguistic information (e.g., tone, formality, subject, etc.) of the text segment. For example, the data processing system may determine, based on the context and linguistic information of the words surrounding the domain entity and the words of the domain entity itself, that the domain entity is a building by determining the words of the domain entity are create a building address. Another example of using surrounding language may be identifying phrases such as, but not limited to, "the address of" and "what is the temperature of." The data processing system may identify each of these phrases as phrases associated with a building type and consequently determine a building type for any entities that occur after each phrase. The data processing system may identify an entity type for any of the candidate entities, matching entities, or domain entities at any step in the process.

At a step 1106, the data processing system may determine if an entity type of the domain entity has been found. If the data processing system has found an entity type, at a step 1108, the data processing system may determine that a domain entity and a type of the domain entity has been detected. If the data processing system has determined that an entity type has not been found, however, at a step 1110, the data processing system may use custom named entity recognition for type detection. The data processing system can compare the words of the domain entity with words in a database 1105 within the data processing system identifying entity types. The words in the database can be singular words or groups of words in a table identifying entity types associated with them. The table may include entity types such as organization name, floor name, wing name, etc. The data processing system can compare words of the domain entity with the table to determine an entity type of the domain entity. At a step 1112, the data processing system may determine if an entity type has been found similar to step 1106.

At a step 1114, the data processing system may determine an entity type for the domain entity by searching a second database within a second computing device to retrieve possible matching entities and their type. The second database can be similar to the database within the data processing system with tables identifying entities and types associated with the entities. The data processing system may compare the domain entity with the table of the second database and identify an entity type if there is a match.

If the data processing system identifies an entity type for the domain entity using the processes of any of steps 1104, 1110, and 1114, the data processing system can upload the text segment including the candidate entity associated with the domain entity to a database within the data processing system. The data processing system can also upload the determined entity type of the domain entity. Advantageously, the uploaded text segment and determined entity can be a new data point that the data processing system can identify in later instances when determining an entity type of a similar domain entity of a text segment.

Figure 12:
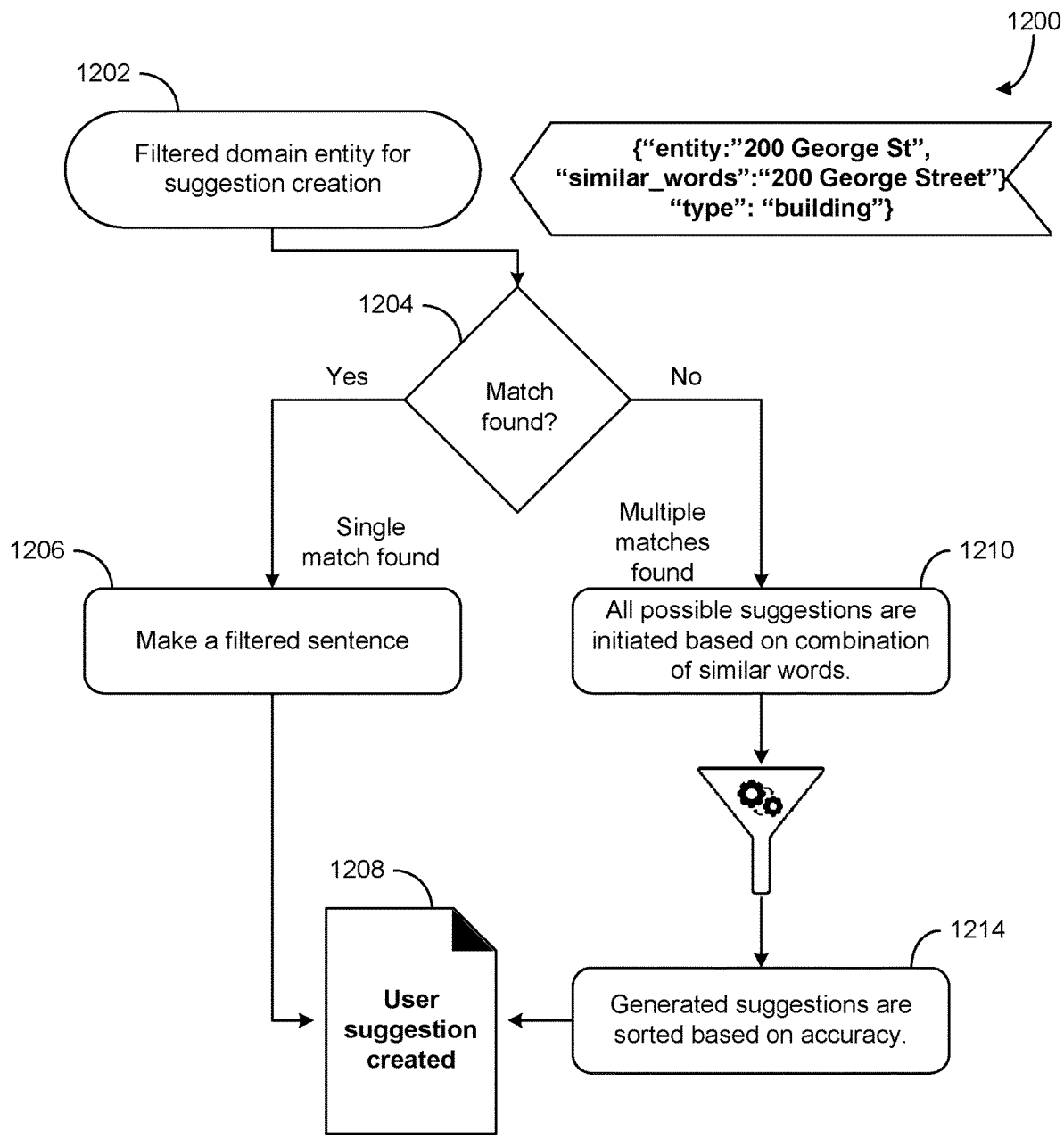
FIG. 12 is a flow diagram of a process for generating a suggestion including matching domain entities to a user interface, according to an exemplary embodiment.

Referring now to FIG. 12, a flow diagram of a process 1200 for generating a suggestion including matching entities to a user interface is shown, according to an exemplary embodiment. Process 1200 may be conducted by a data processing system (e.g., natural language processing system 606). At a step 1202, the data processing system can identify the matching entity, the candidate entity that the matching entity was matched with, and the type of the matching entity. The data processing system may determine that there are more than one matching entities that match the candidate entity based on similarity scores between multiple domain entities and the candidate entity exceeding the threshold. The data processing system can identify each of the multiple domain entities. At a step 1204, the data processing system can determine whether there are multiple matching entities with similarity scores that exceed the threshold.

If there is only one matching entity with a similarity score that exceeds the threshold, at a step 1206, the data processing system can generate a filtered sentence including the matching entity to send to an administrator to determine if the matching entity is the correct domain entity based on the candidate entity of the text segment. At a step 1208, the data processing system can generate the suggestion for a graphical user interface to send to the computing device of the user with an option to indicate whether the suggestion is correct or not.

If, at step 1204, the data processing system determines that there are more than one matching entities with similarity scores that exceed the threshold, at step 1210, the data processing system can generate a list including sentences with each matching entity with a similarity score that exceeds the threshold. At a step 1214, the data processing system can sort the list of sentences based on the similarity scores of the matching entities of the sentences. The data processing system can include the matching entity with the highest similarity score at the top of the list. In some embodiments, the data processing system can include the matching entity with the highest ranking at the top of the list. At step 1208, the data processing system can present the list to the administrator in a graphical user interface so the administrator can select the correct, if any, match entity from the list as the domain entity. The data processing system can update the rankings of each matching entity within its database based on the selection of the administrator (e.g., increment and maintain a counter identifying a number of times the selected domain entity has been selected and compare the counter with counters of other domain entities to determine new rankings).

Figure 13:
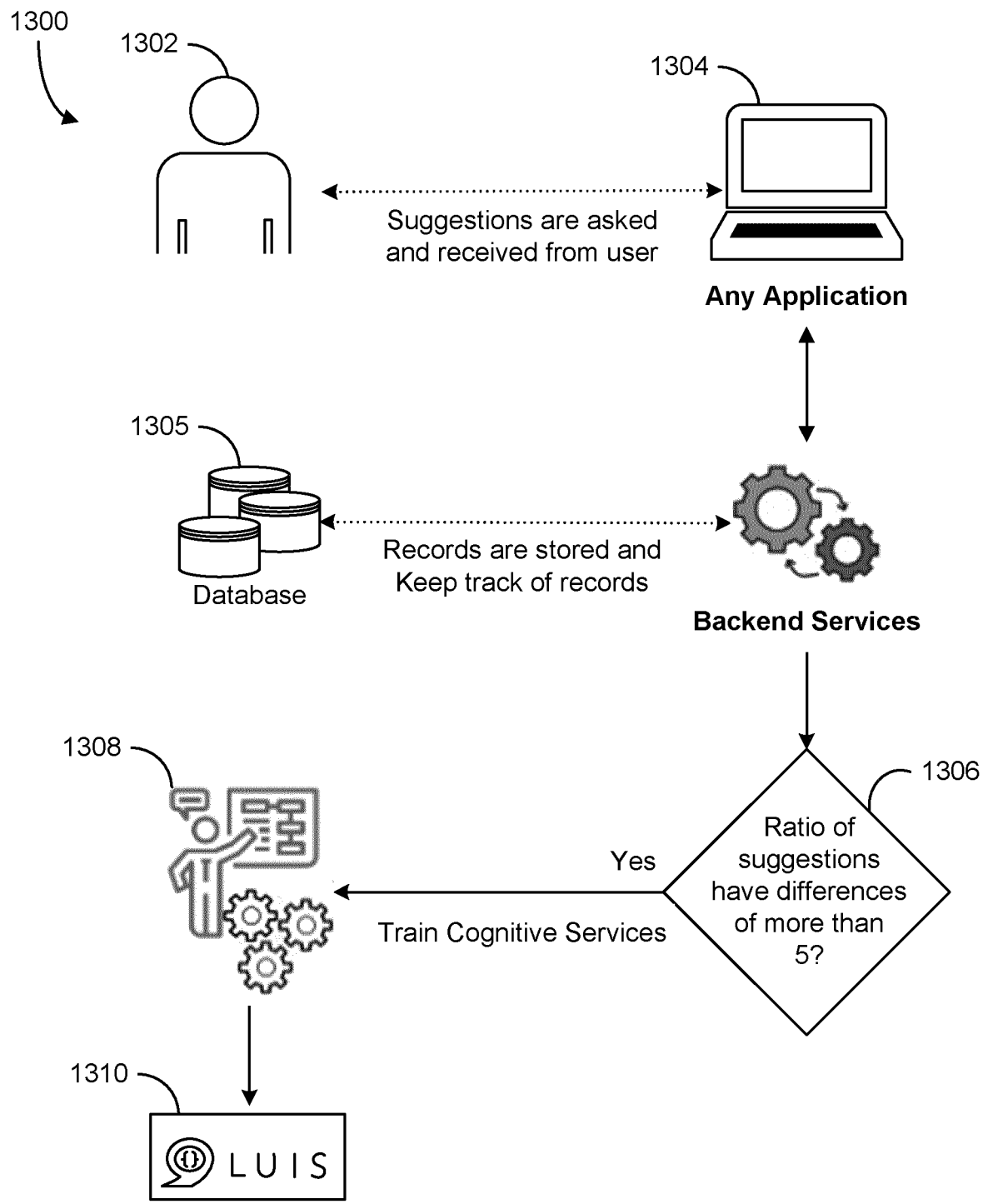
FIG. 13 is a flow diagram of a process for training the language processing service, according to an exemplary embodiment.

Referring now to FIG. 13, a flow diagram of a process 1300 for training the language processing service is shown, according to an exemplary embodiment. Process 1300 may be conducted by a data processing system (e.g., natural language processing system 606). At a step 1302, a user can access a computing device. Process 1300 may be performed after process 1200. The computing device may display a suggestion for the user (e.g., an administrator) to select a matching entity from a list of one or more sentences including the matching entity based on a text segment that the data processing system received.

At a step 1304, the user may select the domain entity from the list of sentences including matching entities. The data processing system may receive the user selection from the user device and store the selection in a database 1305 within the data processing system along with the text segment that resulted in the selection. The data processing system may determine a number of instances the domain entity has been selected based on a similar spelling of the candidate entity of the text segment. The data processing system may do so by incrementing and maintaining a counter associated with the spelling of the candidate entity and the spelling of the domain entity. In some instances, the data processing system can also increment and maintain a counter for each instance the user selected a different domain entity based on the same spelling of the candidate entity.

At a step 1306, the data processing system can determine whether to use the domain entity to train a language processing service 1310 based on the number of, or the ratio of, times the user selected the domain entity based on the same spelling of the candidate entity. The data processing system may implement a predetermined threshold based on the number of times the domain entity was selected or the ratio of selections of the domain entity compared to selections of other domain entities for a same spelling of the candidate entity (e.g., 5:0). If the number or ratio exceeds the threshold, at step 1308, the data processing system can send the domain entity to the language processing service for training. Advantageously, by using domain entities that have been selected a number of times to exceed the threshold, the data processing system can ensure that data being sent to the language processing service for training is accurate and the language processing service can be trained properly. Further, the data processing system can use the suggestions selected by the user to eliminate domain entity suggestions that the user has not picked when given a number of opportunities that exceeds a threshold.

Figure 14:
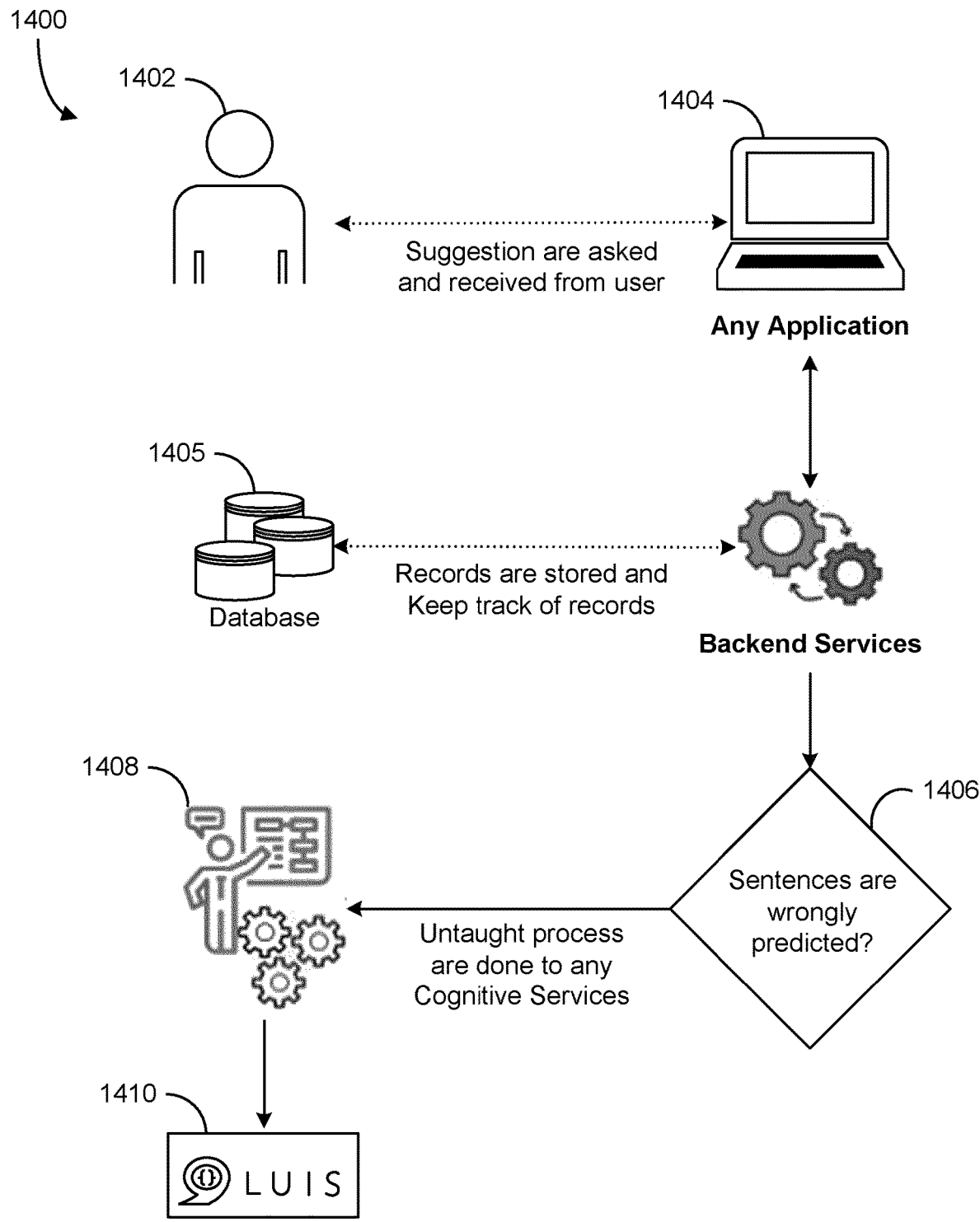
FIG. 14 is a flow diagram of a process for untraining the language processing service, according to an exemplary embodiment.

Referring now to FIG. 14, a flow diagram of a process 1400 for untraining the language processing service is shown, according to an exemplary embodiment. Process 1400 may be conducted by a data processing system (e.g., natural language processing system 606). Steps 1402 and 1404 may be the same as or similar to steps 1302 and 1304 described with reference to FIG. 13. A database 1405 may be the same as or similar to database 1305, shown and described with reference to FIG. 13. The user may select an option indicating that none of the suggested sentences including domain entities is correct. In some instances, the data processing system may receive the selection and determine that it may have been trained improperly. The data processing system may present the user with an option to untrain the data processing system to a zero state where the data processing system has no past selections or matching domain entities to candidate entities in its memory to base future suggestions on.

At a step 1406, the data processing system can determine if the user selected the option to untrain the data processing system. If the data processing system determines the administrator selected the untrain option, at a step 1408, the data processing system can erase any training data or data gathered from user selected suggestions from its memory. In some instances, the data processing system may only remove data related to the candidate entity for which the data processing system wrongly generated suggestions. Advantageously, by being able to untrain itself, the data processing system can solve situations where it has been wrongly trained based on incorrect user inputs. By untraining itself, the data processing system can begin training itself based on correct user inputs.

Figure 15:
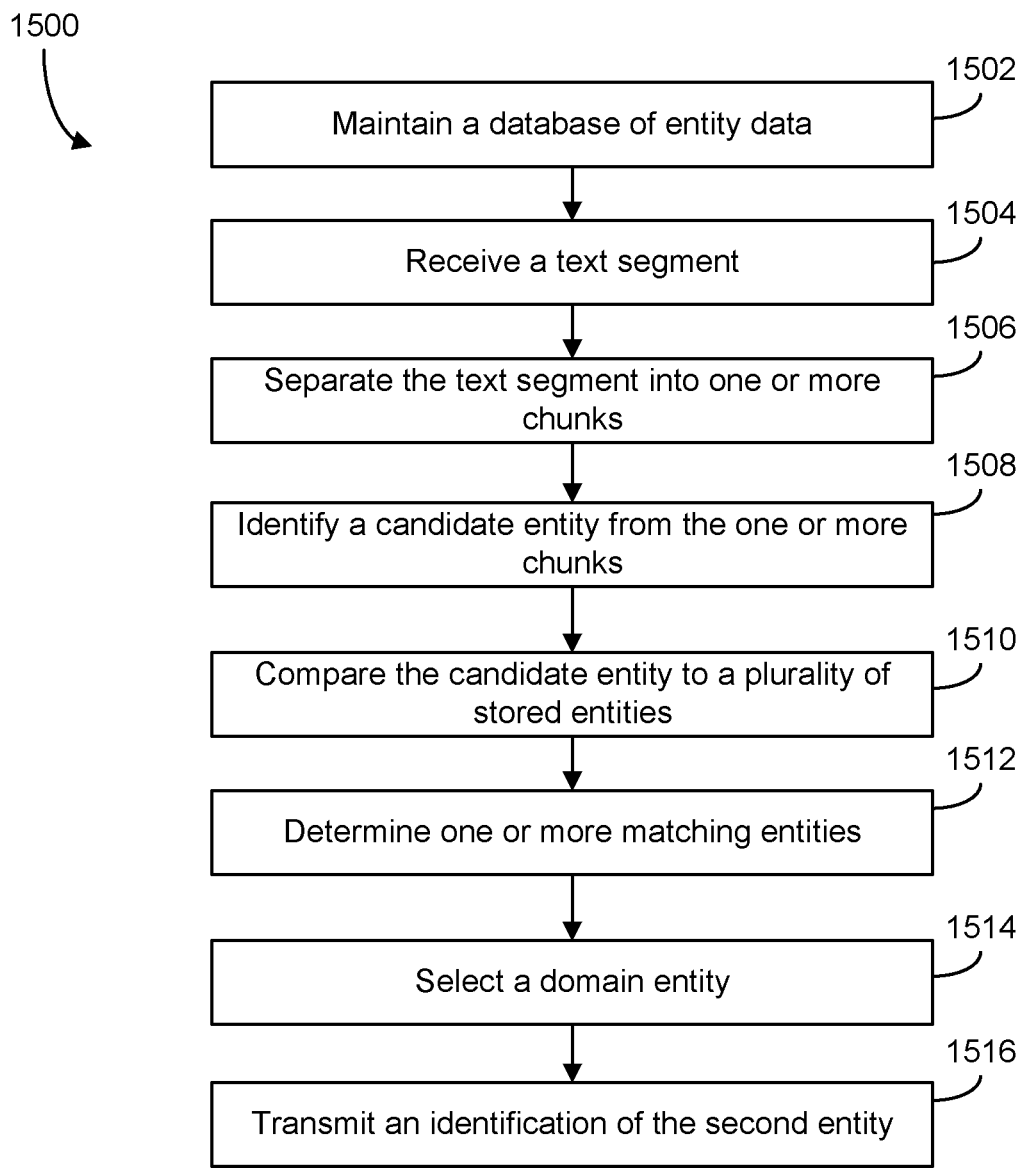
FIG. 15 is a flow diagram of a process for selecting a domain entity based on candidate entities identified from a text segment, according to an exemplary embodiment.

Referring now to FIG. 15, a flow diagram of a process 1500 for identifying domain entities from a text segment is shown, according to some embodiments. Process 1500 is shown to include maintain a database of entity data (step 1502), receive a text segment (step 1504), separate the text segment into one or more chunks (Step 1506), identify a candidate entity from the one or more chunks (step 1508), compare the candidate entity to a plurality of stored entities (step 1510), determine one or more matching entities (step 1512), select a domain entity (step 1514), transmit an identification of the domain entity (step 1516). Steps 1502-1516 can be conducted by a data processing system (e.g., natural language processing system 606). Process 1500 can include any number of steps and the steps can be performed in any order.

At step 1502, the data processing system can maintain a database of entity data. At least a portion of the database of entity data can include information about entities of a building management system (e.g., stored entities). In some instances, the database may be specific to an organization or the building management system. Entities (e.g., candidate entities, stored entities, domain entities, etc.) can be spaces (e.g., conference room A, hallway B, kitchen, etc.) and/or building devices (e.g., chillers, boilers, vav boxes, ACUs, etc.). The database of entity data can include characteristics of the entities of the database. The characteristics can include the type (e.g., the space or building device of the building management system of the entity) of each entity and the context and linguistic information (e.g., part of speech, type of phrase, etc.) of the entity. The data processing system can maintain and update the database of entity data based on administrator inputs and domain entities selected using natural language processing as described herein.

At step 1504, the data processing system can receive a text segment. The data processing system can receive the text segment from a computing device. The text segment may be a product of a speech to text application of the computing device. In some instances, the data processing system may receive the text segment once a language processing system determines that the language processing system may not be able to identify domain entities from the text segment.

At step 1506, the data processing system can separate the text segment into one or more chunks. The data processing system can identify chunks from a database within the data processing system. Each chunk can have a pattern including parts of speech of a text segment. In some instances, the pattern includes the parts of speech occurring in a sequential order. The data processing system can compare the patterns of each chunk to the words of the text segment to identify groups of words that match patterns of the chunks (e.g., include the parts of speech in an order of the pattern).

At step 1508, the data processing system can identify a candidate entity from the one or more chunks. The data processing system can extract a group of words of a chunk of the chunks to identify the candidate entity. The data processing system can identify words of the extracted group of words as the candidate entity. The candidate entity can be an entity that the data processing system identifies as being an entity, but that the data processing system does not associate with any entities within the building system. The data processing system can incorporate the systems and processes described herein to determine which entity of the building system the candidate entity is associated with.

At step 1510, the data processing system can compare the candidate entity to a plurality of stored entities of the entity database. The data processing system can compare the words of the candidate entity to the words of the stored entities of the entity database. The data processing system can compare the entities based on the spelling of each word, a phonetic library, and/or a domain specific library of words specific to a domain of the building management system. The data processing system can use comparisons between the candidate entity and the stored entities to generate similarity scores between the candidate entity and each stored entity. At step 1512, the data processing system can determine one or more matching entities of the plurality of stored entities based on the similarity scores between the candidate entity and the one or more matching entities of the plurality of stored entities exceeding a threshold. The data processing system may determine any number of matching entities.

At step 1514, the data processing system can select a domain entity. The domain entity can be a stored entity that the data processing system selects as being correctly matched with the candidate entity. The data processing system can select the domain entity based on having a similarity score exceeding a second threshold or based on the domain entity having the highest classification of the one or more matching stored entities. In some cases, the data processing system can display the one or more matching entities to a user and the user can select one of the one or more matching entities to be the domain entity.

At step 1516, the data processing system can transmit an identification of the domain entity to a computing device. The data processing system may transmit an identification of the domain entity along with meta data associated with the domain entity identifying the text segment of the candidate entity, context and linguistic characteristics of the words of the text segment, and any other data about the domain entity to the computing device. The computing device may be a user device or a device for a natural language processing service. If the identification is transmitted to the natural language processor, the natural language processor can be trained based on the identification of the data.

Each of the steps and processes described herein that the data processing system can perform to identify entities of a building management system from a text segment can also be performed to identify an intent or context of the segment. An intent can be an intention of a user when the user speaks. For example, a user may say "show me the temperature in conference room B." The intent of the user is to retrieve the temperature of conference room B. The data processing system may identify the intent as "showtemperature." The data processing system may use verb patterns to identify chunks to identify an intent of a text segment. Entities, as described herein, can modify an intent. In the above example, the entity may be conference room B. The data processing system can use the chunking technique of the natural language processing technique described herein to identify both entities and intents.

Advantageously, the systems and methods described herein can be used in a building management system to accurately identify spoken words in scenarios where a transcription service does not perfectly transcribe such words. The systems and methods provide a pattern-based model to identify chunks of words that the system can identify as entities. The system can automatically disregard chunks with entities that the system has not identified as a matching entity recently. The system can identify a group of stored entities with similarity scores that exceed a threshold. In turn, the system can identify the domain entity that is most likely associated with the candidate entity based on a ranking hierarchy that ranks each stored entity of the building system. As the system identifies more entities as being the correct entities of candidate entities, the system can refine the ranking system to determine the entities within the building system that are most likely to be referenced in a text segment and consequently include a higher ranking. Consequently, the system can be self-teaching with data specific to the building management system in which the system is operating. Thus, the system can become more accurate for future text segment inputs.

Further details of identifying phrases using natural language processing techniques are described in U.S. Patent Publication No. 20190147883 filed Jan. 11, 2019, the entirety of which is incorporated by reference herein.

Building Management System with Incident Management with Brick and Natural Language Processing (NLP)

Figure 16:
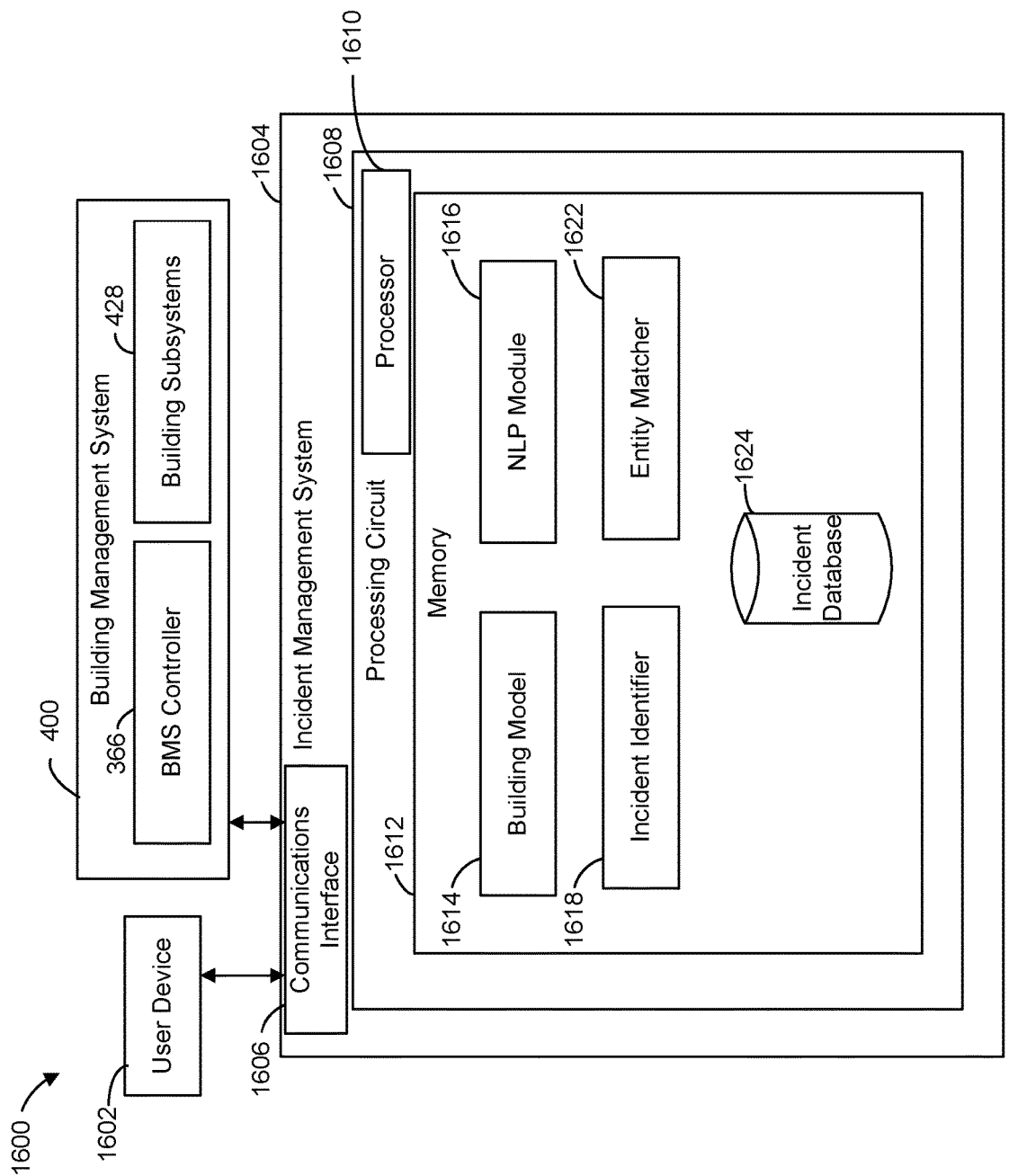
FIG. 16 is a block diagram of a cloud implemented incident management system for identifying incidents and assigning the incidents to second entities, according to an exemplary embodiment.

Referring now to FIG. 16, a block diagram of a system including building network 401 in communication with incident management system 1604 is shown, according to an exemplary embodiment. Building network 401 can include BMS controller 366, building subsystems 228, and/or any items of a building with which incident management system 1604 can be associated. Incident management system 1604 can be configured to identify an incident (e.g., an incident involving a building device or space) based on data determined using natural language processing techniques. Incident management system 1604 can identify the incident and determine a second entity (e.g., a technician) to assign to the incident to resolve it. In some embodiments, incident management system 1604 can identify a technician with the most experience fixing similar incidents. Incident management system 1604 is shown to include a processing circuit 1608 that includes a processor 1610 and a memory 1612. Memory 1612 can include instructions which, when executed by processor 1610, cause processor 1610 to perform the one or more functions described herein. Each of the processes and services conducted by incident management system 1604 can also be conducted by BMS controller 366. In some embodiments, each of the processes and services conducted by incident management system 1604 can be implemented in a cloud and/or by a distribution of servers.

In addition to a traditional processor and memory, processing circuit 1608 may include integrated circuitry for processing and/or control, e.g., one or more processors and/or processor cores (e.g., microprocessor and/or microcontroller) and/or FPGAs (Field Programmable Gate Array) and/or ASICs (Application Specific Integrated Circuitry). Processing circuit 406 can include and/or be connected to and/or be configured for accessing (e.g., writing to and/or reading from) the memory 506, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory).

Memory 1612 can be configured to store code executable by control circuitry and/or other data, e.g., data pertaining to communication, e.g., configuration and/or address data of nodes, etc. Processing circuit 1608 can be configured to implement any of the methods described herein and/or to cause such methods to be performed, e.g., by processor 1610. Corresponding instructions may be stored in memory 1612, which may be readable and/or readably connected to processing circuit 1608. Memory 1612 is shown to include a building model 1614, a natural language processing (NLP) Module 1616, an incident identifier 1618, an entity matcher 1622, and an incident database 1624. Processing circuit 1608 can implement any of components 1614-1624 to store representations of spaces and building equipment as entities within a building model, identify entities of the building model from text segments using NLP techniques, identify incidents pertaining to the entities and the intents, and identify second entities that can be assigned to the incidents. It may be considered that processing circuit 1608 includes or may be connected or connectable to memory 1612, which may be configured to be accessible for reading and/or writing by the controller and/or processing circuit 1608.

Incident management system 1604 is shown to include a communications interface 1606. Communications interface 1606 can be configured to facilitate communication with a user device 1602, devices of building network 401, and/or any other device. Furthermore, communication interface 404 can be configured to communicate with all of the devices and systems described with reference to FIG. 3. Communications interface 1606 may be similar to communications interface 605, shown and described with reference to FIG. 6.

Via communications interface 1606, incident database 1624 can be configured to receive (collect) data from computing devices (e.g., user device 1602). Incident database 1624 can be a graph database, MySQL, Oracle, Microsoft SQL, PostgreSql, DB2, document store, search engine, device identifier-value store, etc. Incident database 1624 is configured to hold any amount of data and can be made up of any number of components, in some embodiments. Incident data stored in incident database 1624 can be data associated with incidents pertaining to issues with building equipment or spaces of a building management system. Incident database 1624 may store templates that are associated with particular incidents and/or criteria that, responsive to being met, causes the template to be satisfied. For example, an incident may be a chiller that is not working properly. The template of the incident may include criteria for determining that the chiller is not working properly. The template may be satisfied based on a report that the air conditioning of a building is broken, a text segment including a phrase such as "It is hot in here," and/or a picture of a broken chiller. Incident management system 1604 may determine incidents to be satisfied based on any criteria.

In some embodiments, the incident data may include entities, intents, keywords, and/or contexts that are associated with text segments that were identified as being associated with previous incidents that have occurred in building management system 400. NLP module 1616 may compare identified entities, intents, keywords, and/or contexts identified from text segments to the entities, intents, keywords, and/or contexts of the incident data to identify parameters. In some embodiments, the entities, intents, keywords, and/or contexts may have been manually stored in incident database 1624 by a user as training data. Such manual entry may be useful in building management systems in which the systems and methods described herein are newly implemented because enough training data may not be available to train incident identifier 1618 to identify parameters from text segments. In some embodiments, NLP module 1616 may identify text segments that were associated with incidents; identify entities, intents, keywords, and/or contexts from the text segments; and store the identified entities, intents, keywords, and/or contexts in incident database 1624. Such embodiments may be advantageous NLP module 1616 may be able to gradually identify or extract a broader range of parameters in a self-learning system and therefore incident identifier 1818 may more accurately identify incidents based on text segments.

Referring still to FIG. 16, building model 1614 is programmed instructions executed by one or more servers or processors that is configured to store data about a building management system in a BRICK based data structure indicating multiple entities (e.g., building devices of building subsystem 428, a space within the building of building subsystem 428, or a building identifier of building subsystem 428 such as a building address or a building name). In some embodiments, the entities may be directed to a specific building type or piece of building equipment type. For example, an entity may represent a specific type of thermostat, chiller, or boiler. An entity may also represent that a building is an office building, a home building, a sports arena, or any other type of building. Furthermore an entity may represent a subspace within a building such as a particular hallway, conference room, bathroom, lobby, etc. Building model 1614 is described in further detail in FIG. 17. BRICK is a unified semantic representation of entity relations in buildings. For example, type, point to equipment, equipment to equipment, spatial, etc., entities may be represented in BRICK. BRICK further defines entity relations in BRICK-based building models that can be queried in software. For example, a query may be, "find all devices connected to HVAC Zone of Room-101." SPARQL can implement queries for building model 1614. BRICK-based building models (or other building models) can be created and maintained as a part of the process of building commissioning and operation of a building. In some embodiments, building model 1614 is stored in incident database 1624 and may be described as incident data herein.

NLP module 1616 may be configured to identify entities, intents, keywords, and/or contexts of text segments provided to incident management system 1604 using natural language processing techniques. NLP module 1616 can be configured to receive an input from a user device including one or more text segments. The input may be a transcription of one or more utterances made in a phone call by a user and/or a description in an incident ticket received via an application associated with the building management system. The phone call or the incident ticket may have been made by a user that is experiencing an incident (e.g., an issue regarding a building management system) and is looking to have the incident resolved. Examples of incidents may be a burnt outlet, a broken phone, a broken thermostat, etc. The user may make the phone call or fill out the incident ticket in a request for a second entity (e.g., a technician) to come to the site of the incident and resolve the incident and/or problems associated with the incident. In some embodiments, the user may make the phone call and a user on the other end of the line may fill out the incident ticket as the user is describing the incident.

In some embodiments, NLP module 1616 can identify or extract parameters from a transcription or an incident ticket. Parameters may be keywords, intents, entities, or contexts that NLP module 1616 identified as matching a corresponding component in incident database 1624. Incident identifier 1618 may use the extracted parameters to determine if a template of an incident is satisfied and consequently the incident that is the subject of the text segment.

To extract an entity as a parameter, NLP module 1616 may identify entities from a text segment and identify the corresponding entities from incident data in incident database 1624. For example, NLP module 1616 can receive or obtain a transcript of a phone call from a transcription service or, in some embodiments, transcribe the phone call using transcription techniques. NLP module 1616 can use the natural language processing techniques described above with reference to FIGS. 5-15 to identify entities (e.g., representations of specific building devices or spaces stored in the BRICK data structure) of building management system 400 that are referenced in the text segments of the transcript of the phone call. NLP module 1616 can identify entities of the transcript using the chunking techniques described above. For example, NLP module 1616 can separate the text segment into one or more chunks based on parts of speech of words of the text segment and identify entities from the chunks.

In some embodiments, the entities that NLP module 1616 identifies from the text segments may be unrecognized entities. Unrecognized entities may be or may be associated with classifications, entity types, or tokens of entities that can be used to determine the respective entity in the BRICK data structure. For example, using the chunking techniques described above on a text segment, NLP module 1616 may identify the word "chiller" from the sentence as an unrecognized entity. Based only on the unrecognized entity, NLP module 1616 may not be able to determine the chiller is a chiller or a particular chiller within the BRICK data structure. To determine the chiller being referenced in the text segment, NLP module 1616 may compare the letters of the word chiller associated with the identified unrecognized entity to the incident data (including the BRICK data structure) in incident database 1624. NLP module 1616 may identify a matching set of letters and identify the particular chiller within building management system 400 that is experiencing an incident. The chiller may be a parameter that incident identifier 1618 may use to determine an incident is occurring involving the particular chiller.

NLP module 1616 may perform a similar process to extract intents from text segments as parameters. For example, NLP module 1616 may identify a group or chunk of words in a text segment as an intent based on parts of speech of each of the words in the group falling into an intent grouping or pattern. NLP module 1616 may identify the group and determine the intent based on the group (e.g., by comparing the group to incident data in incident database 1624 and identifying an intent that matches the grouping). NLP module 1616 may extract the identified group as a parameter for incident identifier 1618 to use to determine if a template of an incident is satisfied. NLP module 1616 may use any technique to identify and/or extract intents from text segments.

In some embodiments, NLP module 1616 extracts keywords from text segments by comparing the words of the text segment to a table of incident database 1624. As described above, incident database 1624 may store a table indicating keywords that have been identified (e.g., manually labeled by an administrator or user) as being associated with one or more incidents that have previously occurred or that have otherwise been labeled in incident database 1624. NLP module 1616 may compare the words of the text segment to the table to determine if any of the words have a match within the table. Responsive to identifying a match within the table, NLP module 1616 may determine the matched word is a keyword and is a parameter and identify or extract the keyword. Consequently, NLP module 1616 may determine parameters from a text segment that incident management system 1604 receives or obtains. In some embodiment, NLP module 1616 extracts each of the identified or extracted keywords, intents, entities, and contexts of text segments as parameters for incident identifier 1618 to use to determine if a template or incident is satisfied.

Further, NLP module 1616 can identify the context (e.g., the subject matter of the text segment and/or a tone) of the text segment. NLP module 1616 can be configured to identify the context of a text segment by identifying the tone and keywords of the text segment. In some instances, the context can include items related to the incident such as the location of the incident, the space, the building device, category, the issue, a description, a priority (e.g., criticality), or any other aspect of the incident. Each of the items of the context can be identified by NLP module 1616 using natural language processing techniques to identify keywords related to each item. NLP module 1616 can identify the nature and the priority or criticality of an incident based on the context and comparing keywords of the segment to words in a database. The words in the database may be in a table and may be matched with different tags or labels such as subject matter (e.g., subjects such as building equipment, problems with building equipment, etc.) or tone (e.g., formal or informal; command, statement, or question; etc.). NLP module 1616 can use the tags or labels to determine context of a text segment.

NLP module 1616 may use the identified context, the identified words and tags or labels, and/or the identified tone to determine a priority of a text segment. NLP module 1616 may do so by comparing the identified context, the identified words and/or their tags or labels, and/or an identified tone to templates associated with high, medium, and/or low priorities. NLP module 1616 may identify a template that matches these components and identify the priority that is associated with the template.

For example, incident management system 1604 may be configured to receive a transcription of a phone call from a user about a problem the user is having with a thermostat. NLP module 1616 may be configured to receive the transcription and identify the entity associated with the thermostat of a building management system using natural language processing techniques, such as the techniques described above. NLP module 1616 may be configured to compare the word thermostat with a database associated with the building management system of the thermostat and identify the entity of the thermostat based on the thermostat being the only thermostat of the building management system. NLP module 1616 may also be configured to determine that the incident is not critical based on language in the transcript indicating that the user wanted the incident resolved within the month. NLP module 1616 may compare such language to a template associated with a not critical priority and determine the language satisfies the template. In some embodiments, once NLP module 1616 identifies the entity, keywords, and the priority of the incident based on the determined context, incident identifier 1618 can be configured to determine what the incident is.

In some embodiments, the incident data may only include keywords, intents, entities, or contexts that are specific to building management system 400. For example, the incident data may include names of building equipment, conditions of the building equipment, a type of the building equipment, and spaces of building subsystem 428. Consequently, incident identifier 1618 may be able to accurately pinpoint which device of building management system 400 is experiencing an incident after identifying keywords, intents, entities, or contexts that may not be particular to building management system 400.

In some embodiments, NLP module 1616 may receive incident tickets through a graphical user interface that is displayed to a user reporting an incident. The graphical user interface may provide the user with options to describe the incident such as, but not limited to, a location of the incident, a space, a category, an issue, a description, a priority level (e.g., high, medium, low), and any photos the user has of the incident. The user may describe the issue in the description. NLP module 1616 may parse the description of the incident to identify keywords, intents, entities, and/or contexts that are associated with incidents of incident database 1624 as described above. Incident identifier 1618 can use the data from the user inputs describing the incident to identify an incident from incident database 1624 that is associated with the description. In some embodiments, incident identifier 1618 can use a combination of the description of the incident ticket and a phone call to identify the incident. As described herein, a text segment may include a transcription or a portion of the transcription of a phone call including utterances describing an incident and/or the description of an incident made through the graphical user interface.

Incident identifier 1618 is programmed instructions executed by one or more servers or processors that is configured to identify incidents from incident database 1624 based on the entities, intents, keywords, and/or a priority of the incident as determined by NLP module 1616. Incident identifier 1618 can be configured to identify incidents that are reported to incident management system 1604 through phone call transcriptions or through incident tickets. Incident identifier 1618 can identify incidents based on any method. Incident identifier 1618 can identify the key words, intents, entities, and context of text segments that NLP module 1616 extracts as parameters from a transcription or an incident ticket. Incident identifier 1618 can compare each of the key words, entities, intents, and context to the templates of each incident in incident database 1624 to determine which incident matches the key words, entities, intents, and context. Incident identifier 1618 can identify incidents using any method.

The templates of the incidents may each include a checklist identifying keywords, intents, entities, and contexts to which incident identifier 1618 can compare extracted parameters and/or identified keywords, intents, entities, and contexts of a text segment from a transcription or an incident ticket to determine if the templates are satisfied. Each template may be associated with an incident. Templates may require all or any portion of the extracted parameters and/or keywords, entities, intents, and context of the template to be satisfied. In some embodiments, a template may be satisfied responsive to particular parameters or keywords, entities, intents, or contexts of the template being satisfied (e.g., responsive to incident identifier 1618 identifying a matching keyword, entity, intent, or context from a text segment). Incident identifier 1618 can compare the parameters and/or keywords, entities, intents, and/or context to each template of incident database 1624 and determine which template is satisfied and is therefore a match with the input text segment. Responsive to incident identifier 1618 determining a template is satisfied, incident identifier 1618 may identify the incident associated with the template as a satisfied incident.

In some embodiments, templates may be associated with a priority. As described above, a priority may be an urgency or an importance of the particular incident being satisfied quickly. For a text segment, incident identifier 1618 may identify the priority as determined by NLP module 1616. Incident identifier 1618 may determine if a template is satisfied by comparing the priority of the text segment to the priority of the template in addition to any entities, intents, keywords, or contexts that NLP module 1616 identified as parameters.

In some embodiments, incident identifier 1618 can determine templates and incidents of incident database 1624 to be satisfied based on information input by a user in an incident ticket in addition to or instead of a transcription regarding the same incident. The incident ticket may be a standalone input to incident management system 1604 (e.g., the only input to incident management system 1604) or linked to a transcription of a phone call pertaining to the same incident. Incident identifier 1618 can link the incident ticket to the transcription based on language of the description of the incident ticket being similar to language of the transcription or based on the same user submitting the ticket and making the transcribed phone call. Incident identifier 1618 may link the transcription and the incident ticket by storing a flag or setting in a data structure of incident management system 1604 indicating the incident ticket and the transcription are linked. In some embodiments, incident identifier 1618 can identify, using language processing techniques such as those described herein, the space or building of an incident of a building and the space or building of an incident ticket. Incident identifier 1618 may determine the space or building of the incident ticket and the transcription match and link the incident ticket to a transcription identified as being associated with the same space or building. Consequently, incident identifier 1618 may use information from both the incident ticket and the transcription to determine if a template of an incident was satisfied.

Incident identifier 1618 can be configured to identify features of the incident based on photographs using object recognition techniques. For example, incident identifier 1618 can identify features of the incident by converting the photograph to one or more eigenvectors and comparing the eigenvectors to eigenvectors of pictures of incidents in a database within incident management system 1604. Incident identifier 1618 may use any object recognition technique to identify features of an incident. Incident identifier 1618 may use the identified features of the photograph and/or other information from the incident ticket to determine a satisfied incident based on a template.

Incident identifier 1618 may obtain information from the incident ticket that it did not identify from the transcription of the phone call (e.g., location, space, category, issue, priority, type, and photographs) or vice versa. For example, incident identifier 1618 may obtain a picture of a burnt outlet and determine features of the burnt outlet such as the outlet being burnt, a type of outlet, or a location of the burnt outlet using object recognition techniques. Incident identifier 1618 may also receive a transcript of a phone call regarding the same burnt outlet. Incident identifier 1618 may identify keywords, entities, and/or intents from the phone call and use the identified keywords, entities, and/or intents from the phone call in addition to the identified features from the picture of the burnt outlet to determine a template associated with the burnt outlet is satisfied. Incident identifier 1618 may identify any information from the incident ticket (e.g., information from a description of the issue using natural language processing techniques such as those described herein, a category of the incident, a priority of the incident, a space of the incident, a building of the incident, etc.) from the incident ticket in addition to a transcript to determine an incident was satisfied.

For example, incident management system 1604 may be configured to receive an incident ticket and a transcription of a phone call regarding a burnt outlet of a home. NLP module 1616 may use the techniques described herein to identify the outlet as burnt and determine that the issue is severe based on an entity, keywords, and/or intents that NLP module 1616 is able to identify from the phone call transcription. Based on the transcription, NLP module 1616 can identify the type of the outlet that is burnt and what system (e.g., which building management system) the outlet is in. Incident management system 1604 may identify the space, room, and exact issue of the incident based on information of the incident ticket such as the text and the identified features of the photograph. NLP module 1616 can identify each aspect of the burnt outlet incident including which specific outlet is burnt, what type of outlet it is, what system the outlet is in, the urgency of fixing the burnt outlet, etc., based on the phone call transcription and/or the incident ticket.

Advantageously, by using a combination of phone call transcriptions and incident tickets to report an incident, a user reporting the incident may not need to identify each aspect of the incident in either the call or the ticket. Incident management system 1604 can use the combination of the phone call transcription and the incident ticket to identify a satisfied incident. Consequently, a user may not need to identify each characteristic of the incident in an incident ticket or based on the phone call for the incident to be identified.

Entity matcher 1622 is programmed instructions executed by one or more servers or processors that is configured to match incidents identified from incident database 1624 with second entities (e.g., technicians) that can solve the incidents. Incident management system 1604 may include a database (not shown) that stores information about the second entities including the information about the types of incidents that the second entities have worked on in the past. An incident type may be based on the type of building equipment associated with or experiencing the incident and/or the issue the building equipment is experiencing or is otherwise associated with. Entity matcher 1622 can update the information associated with each of the second entities in the database as the second entities work to fix more incidents (e.g., increment a counter for an entity each time the entity resolves an incident and transmits a signal to incident management system 1604 indicating the issue has been resolved). Entity matcher 1622 can increment and maintain counters associated with each type of incident and second entity for each incident that the respective second entity resolves.

Entity matcher 1622 can be configured to identify second entities that have the most experience with a type of incident that incident identifier 1618 identifies from text segments in phone call transcription and/or an incident ticket. Incident identifier 1618 can identify the type of incident and aspects of the incident (e.g., space, device, system, issue, etc.), and entity matcher 1622 can identify the second entity (e.g., a technician) that has the most experience with the identified type and aspects of the incident (e.g., that has fixed the most incidents of that type). Entity matcher 1622 can match the second entity with the most experience fixing the incident type identified by incident identifier 1618 and transmit a signal to a computing device (e.g., user device 1602) of the second entity indicating for the second entity to fix or resolve the incident. Advantageously, by selecting the second entity with the most experience to resolve the incident, entity matcher 1622 can ensure that the incident will be resolved quickly and well.

For example, incident identifier 1618 may identify that a building with a building management system has a broken thermostat. Incident identifier 1618 may identify the type of thermostat and aspects of the building management system that the thermostat is a part of based on the entities, intents, contexts, and/or keywords as determined by NLP module 1616. Entity matcher 1622 can parse through a database within incident management system 1604 to identify second entities that have incremented counters associated with broken thermostats particular to the type of the thermostat. Entity matcher 1622 can select a second entity that has the highest counter and transmit a signal to the computing device of the selected second entity indicating for the second entity to resolve the incident.

In some embodiments, entity matcher 1622 may identify the second entity by identifying the second entity that has been associated with a satisfied incident the most times. Incident management system 1604 may store, for a template of a satisfied incident (and other incidents), a counter for each of the plurality of second entities, each counter having a count identifying the number of times the respective second entity has resolved the satisfied incident associated with the template. Entity matcher 1622 may compare the counts associated with each of the second entities. Entity matcher 1622 may select a second entity responsive to the second entity being associated with the highest count of the plurality of second entities. Consequently, entity matcher 1622 may identify the second entity that has resolved the most similar incidents in the past.

Figure 17:
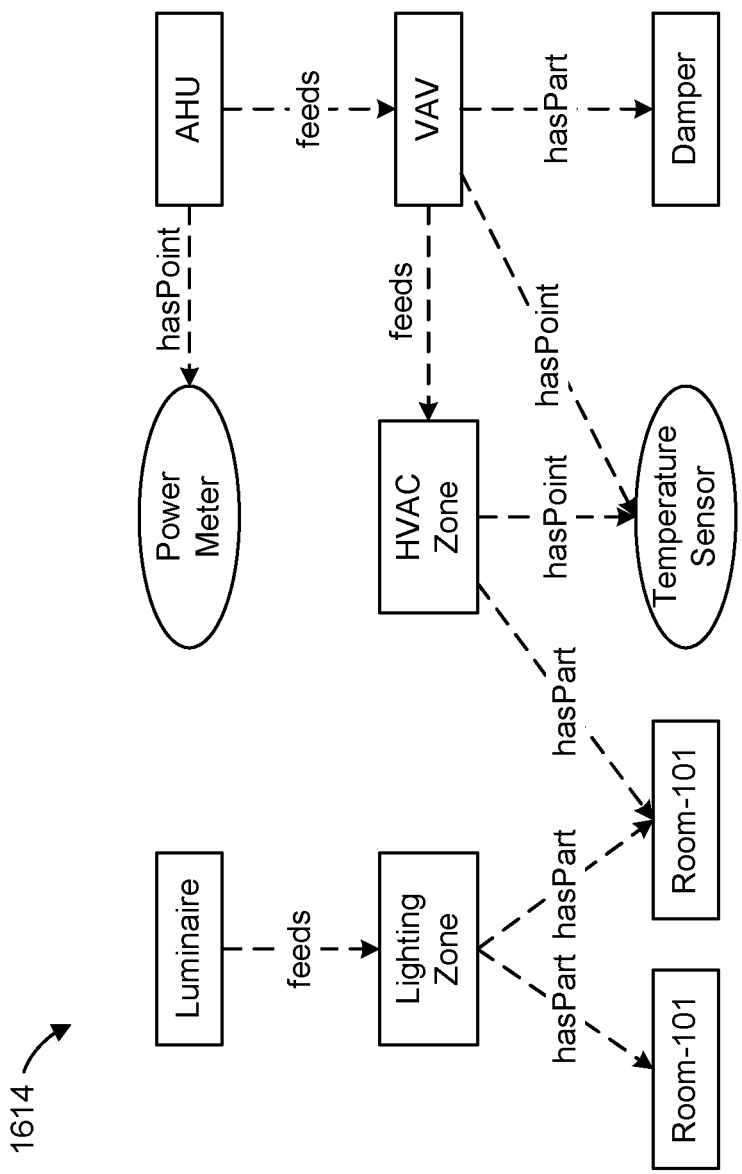
FIG. 17 is a block diagram of the building model illustrated in FIG. 16 shown in greater detail to include multiple entities and relationships between entities, according to an exemplary embodiment.

Referring now to FIG. 17, a block diagram of building model 1614 illustrated in FIG. 16 shown in greater detail to include multiple entities and relationships between entities is shown, according to an exemplary embodiment. The building model 1614 is shown to include multiple entities representing particular physical building devices. The entities include a luminaire, a light zone, a first room, a second room, an HVAC zone, a temperature sensor, a damper, a VAV, an AHU, and a power meter. Although the entities shown in the building model 312 represent HVAC devices and spaces, the entities can also represent security devices, fire systems, vehicles, etc. The building model 312 further includes relational entities. The luminaire "feeds" the light zone while the lighting zone "hasPart" first room and second room. The HVAC zone "hasPart" the first room and "hasPoint" the temperature sensor. The VAV "feeds" the HVAC zone and "hasPoint" the temperature sensor and "hasPart" the damper. Finally, the AHU "feeds" the VAV and "hasPoint" the Power Meter. Examples of building models can be found in U.S. patent application Ser. No. 16/666,005 filed Oct. 28, 2019 and U.S. patent application Ser. No. 16/048,052 filed Jul. 27, 2018, the entireties of each of which are incorporated by reference herein.

This representation of FIG. 17 can be implemented by incident management system 1604, which identifies issues particular to devices that can be resolved by a second entity (e.g., a technician) selected based on the experience of the second entity with similar incidents. The entities from the system can be identified using the natural language processing techniques described above with reference to FIGS. 5-15. For example, incident management system 1604 may receive a text segment from a telephone transcription including the string "The air conditioning unit is not working." Incident management system 1604 can identify the specific air conditioning unit and the type of air conditioning unit to which the end user is referring by using the NLP techniques described herein. Incident management system 1604 may also determine a condition (e.g., broken, burnt, loud, quiet, slow, fast, etc.) of the air conditioning unit using natural language processing techniques (e.g., based on key words, intents, and/or other entities identified from the text segment). Incident management system 1604 can identify a second entity that has worked on similar issues and/or with similar air conditioning units and assign the task of fixing the air conditioning unit to which the end user was referring to the identified second entity. Further details of entity representations of buildings and systems that can generate and manage the entity representations are described in U.S. patent application Ser. No. 16/048,052 filed Jul. 27, 2018 and U.S. patent application Ser. No. 16/666,005, filed Oct. 28, 2019.

Figure 18:
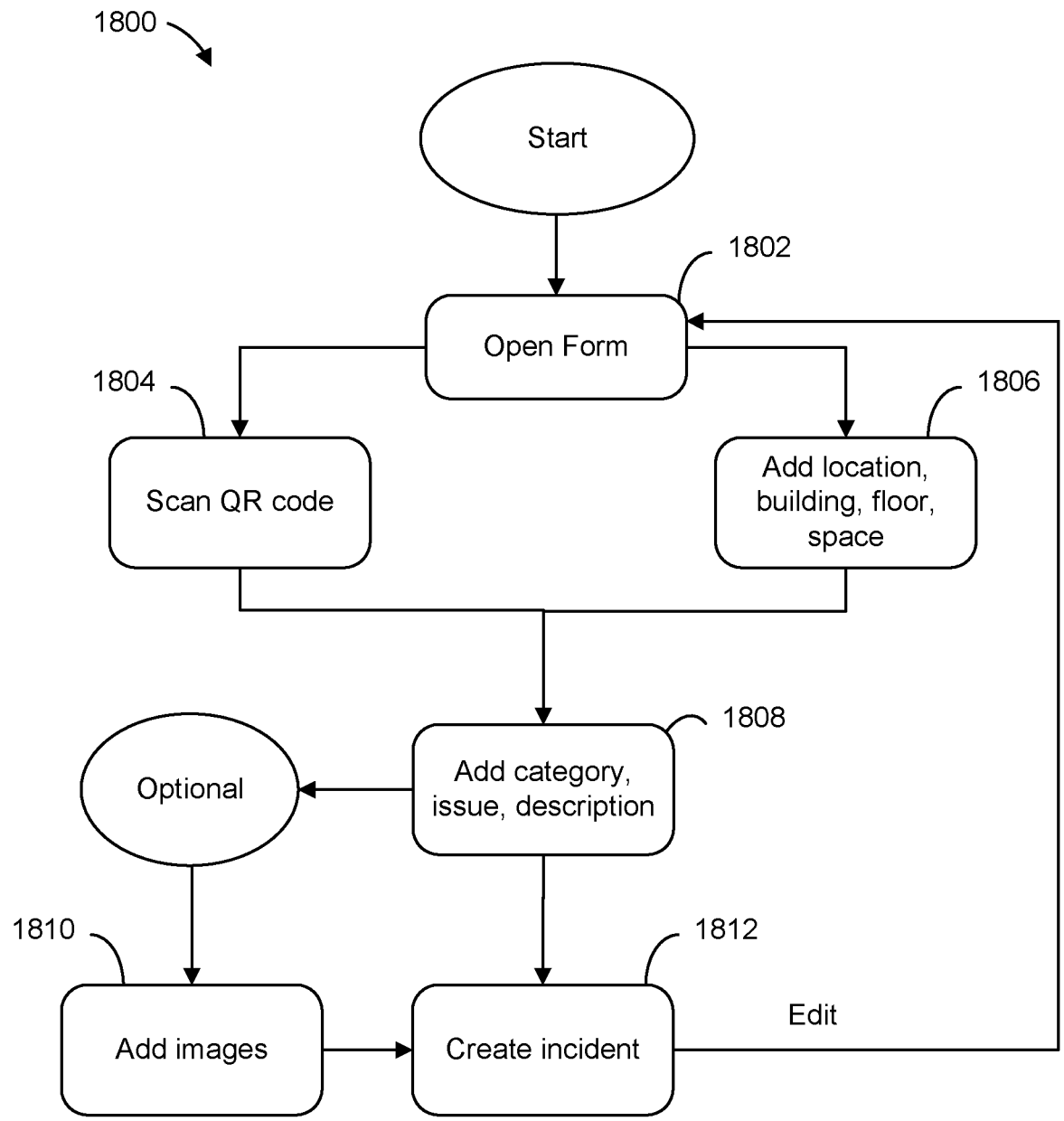
FIG. 18 is a flow diagram of an end user workflow to create an incident template, according to an exemplary embodiment.

Referring now to FIG. 18, a flow diagram of an end user workflow 1800 to create an incident is shown, according to an exemplary embodiment. At a step 1802, an end user of a company implementing the systems and methods described herein can open a form on a user interface and input different aspects of an incident to the incident ticket. At a step 1804, the end user may scan a QR code identifying aspects of the incident such as the location, building, floor, and space where the incident occurred or is occurring. In some embodiments, instead of scanning a QR code, at a step 1806, the end user may manually input such information into the work order user interface. At a step 1808, the end user may also manually type in a category, issue, and description of the incident. Optionally, at a step 1810, the end user may supply a picture to the incident ticket. The end user may input up to a threshold number of images. At a step 1812, the end user can send the incident to incident management system 1604 to be parsed so the type, priority, and building device or space of the incident may be identified from the incident ticket. The end user may open the form to edit the incident. In some embodiments, the input aspects of the created incidents may be a template to which incident management system 1604 may compare extracted parameters from text segments to determine satisfied incidents. Thus, the end user may create a template for an incident.

Figure 19:
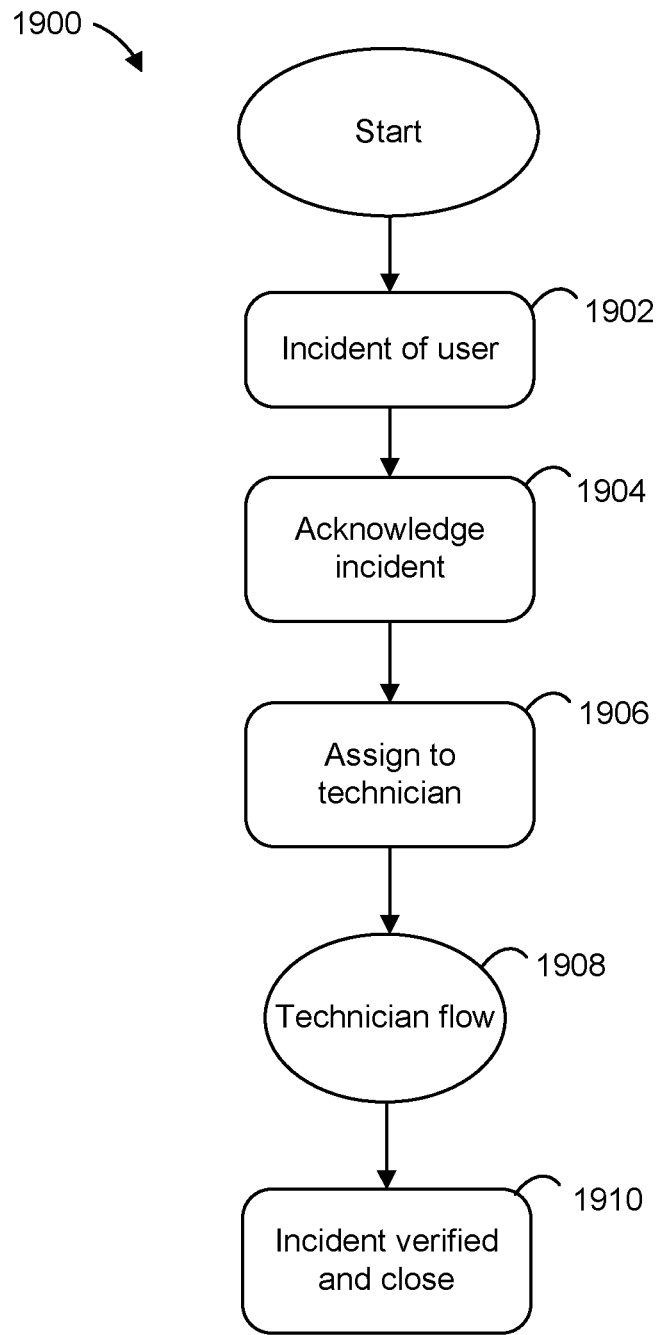
FIG. 19 is a flow diagram of an administrative workflow for acknowledging an incident reported by a user and assigning the incident to a second technician, according to an exemplary embodiment.

Referring now to FIG. 19, a flow diagram of an administrative workflow 1900 for acknowledging a reported incident and assigning the incident to a technician is shown, according to an exemplary embodiment. At a step 1902, an administrator may receive a call and/or an incident ticket which describes the incident. The administrator may feed a transcript of the call and/or the incident description and picture into incident management system 1604 to determine the incident. At a step 1904, incident management system 1604 may output the incident to the administrator. At a step 1904, incident management system 1906 may assign the incident to a technician. Incident management system 1906 may do so based on the technician that has previously resolved the most similar incident to the acknowledged incident. Incident management system 1906 may transmit a signal to a computing device of the technician indicating the technician has been assigned an incident. At a step 1908, the technician may receive the signal and resolve the incident, as is further described in FIG. 20. At a step 1910, incident management system 1604 may verify the incident was resolved and close the incident. Incident management system 1604 may verify the incident was resolved responsive to receiving a signal from a computing device of the technician or of the user that was experiencing or reported the incident indicating that the incident was resolved.

Figure 20:
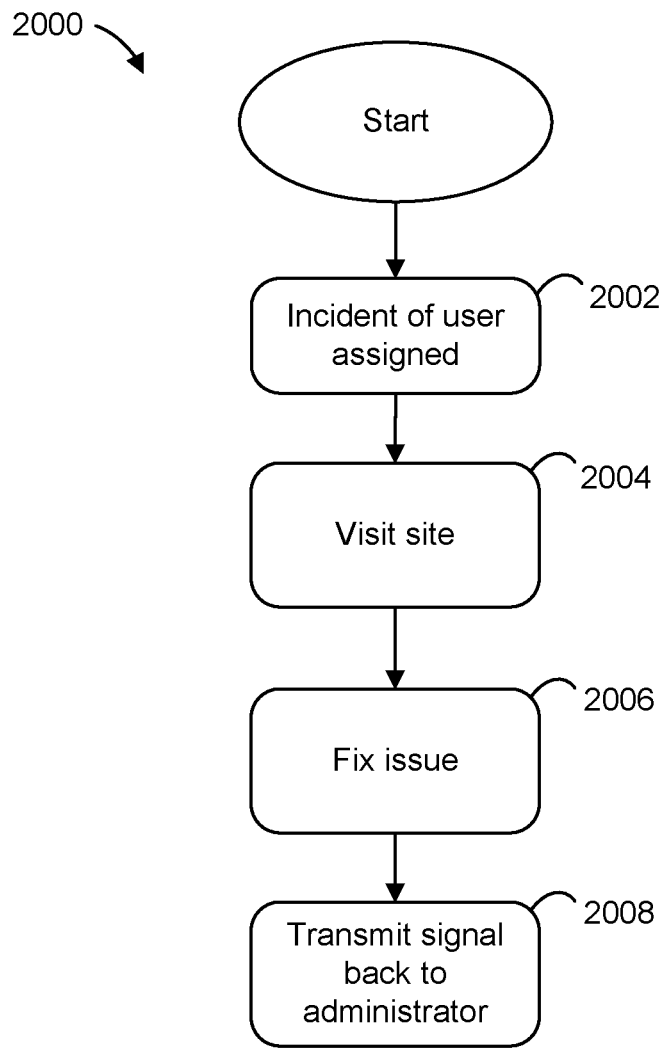
FIG. 20 is a flow diagram of a technician workflow for receiving the incident and resolving the incident, according to an exemplary embodiment.

Referring now to FIG. 20, a flow diagram of a technician workflow 2000 for receiving an incident and resolving the incident is shown, according to an exemplary embodiment. At a step 2002, a technician can receive, via a computing device, a signal indicating the technician has been assigned to resolve an incident. The technician can receive the signal from incident management system 1604 responsive to incident management system 1604 processing a text segment describing the incident and/or a picture of the incident. At a step 2004, the technician can go to the building site experiencing the incident and, at a step 2006, resolve the issue. At a step 2008, via the computing device, the technician can transmit an indication to a user that reported or experienced the incident and/or the administrative device that transmitted the signal to the technician to indicate that the incident has been resolved.

Figure 21:
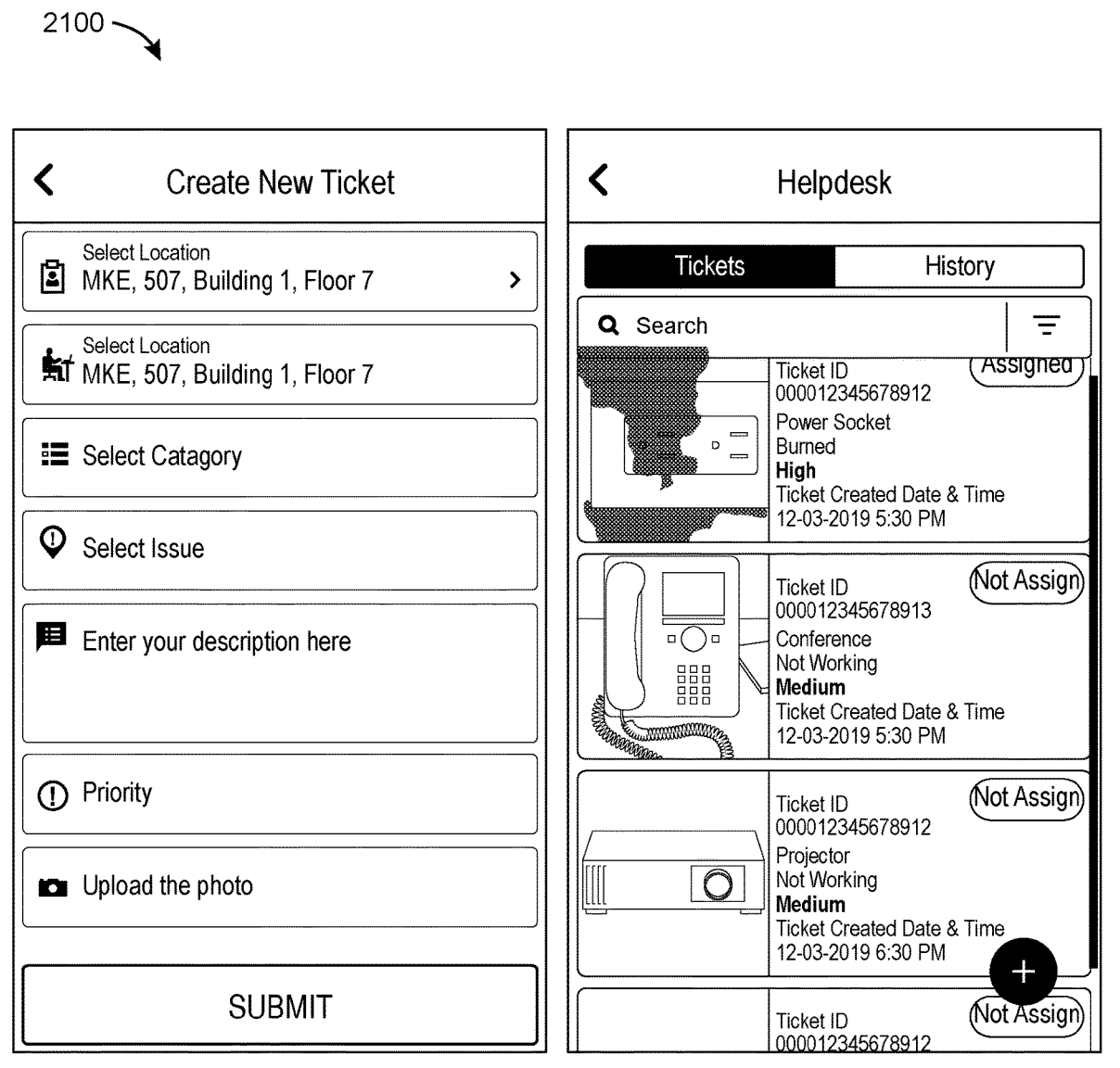

Referring now to FIG. 21, a graphical user interface 2100 including an incident ticket screen 2102 that a user can use to report an incident and an active incidents screen 2104 is shown, according to an exemplary embodiment. On incident ticket screen 2102, a user can manually input information about an incident that the user is experiencing or noticed in a building system. The user may input the location, space, category, issue, description, and priority of the incident. The user may also input a picture of the incident if possible. Once the user inputs the information, the user may select the submit button to submit the incident ticket to incident management system 1604. In some cases, the user may also call an operator or speak into an assistant to describe the incident, based on which a transcript may be used to identify the issue. On active incidents screen 2104, currently active incidents (e.g., incidents that have not been resolved yet) may be displayed. Active incidents screen 2104 may show a list of incidents and their current assignment status (e.g., assigned or not assigned). Active incident screen 2104 may show an identification of the ticket that was used to report the incident and, in some embodiments, a picture of the incident. A user may toggle between currently active incidents and resolved incidents to view a history of incident that have been reported or resolved at the building system.

Figure 22:
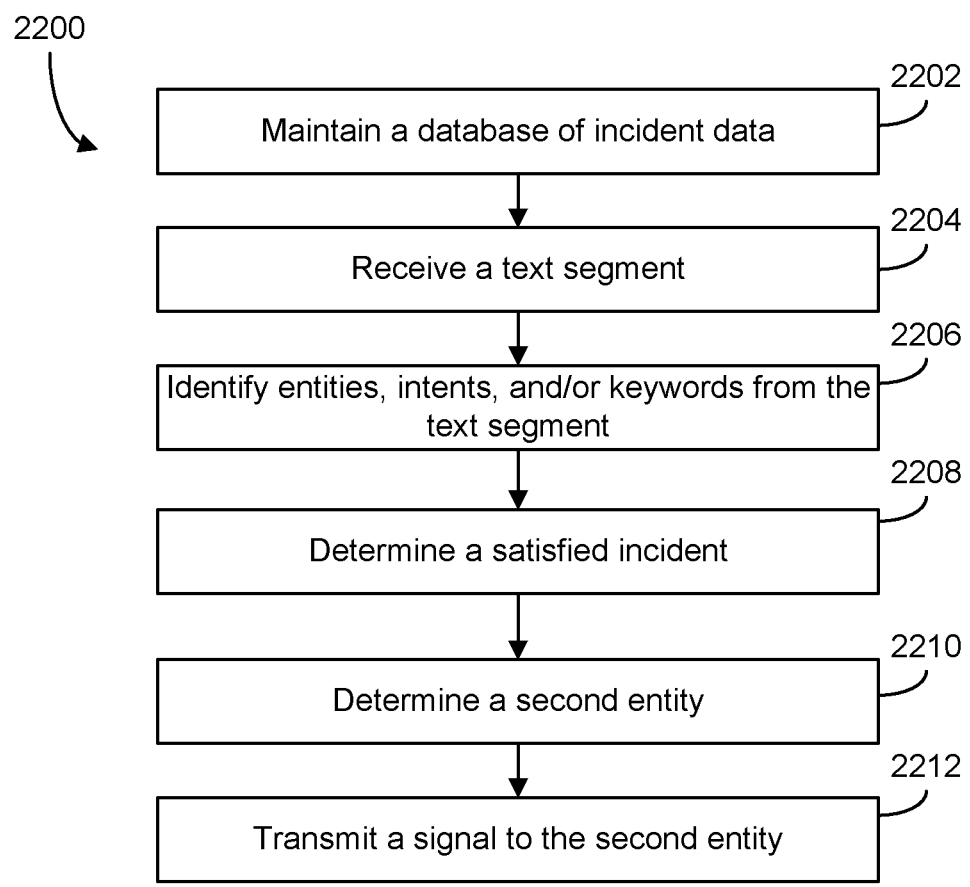
FIG. 22 is a flow diagram of a process for identifying incidents reported by an end user and assigning the incidents to a second entity, according to an exemplary embodiment.

Referring now to FIG. 22, a flow diagram of a process 2200 for identifying incidents reported by an end user and assigning the incidents to a second entity, according to an exemplary embodiment. Process 220 is shown to include maintain a database of incident data (step 2202), receive a text segment (step 2204), identify entities, intents, and/or keywords from the text segment (step 2206), determine a satisfied incident (step 2208), determine a second entity (step 2210), and transmit a signal to the second entity (step 2212). Steps 2202-2212 can be conducted by a data processing system (e.g., natural language processing system 606 or incident management system 1604). Process 2200 can include any number of steps and the steps can be performed in any order.

At step 2202, the data processing system can maintain a database of incident data. At least a portion of the database of incident data can include information about incidents that can or have occurred in a building management system (e.g., issues that a building management system may experience that can be reported by an administrator). The database may also include a building model of a building in a BRICK schema. In some instances, the database may be specific to an organization or the building management system. Examples of incidents can include burnt sockets, broken thermostats, broken phones, broken projector, circuit malfunction, etc. The database of incident data can include aspects of the incidents. In some embodiments, the aspects of incidents can include an entity associated with the incident (e.g., a building device or a space), a type of a building device (e.g., make and model), a system in which the incident occurred (e.g., the building management system), and/or a priority that is generally associated with the incident. Examples of priorities may include low, medium, and high. In some embodiments, the aspects of the incidents may include entities, intents and/or keywords that may be matched with a corresponding identified component from a text segment.

At step 2204, the data processing system can receive a text segment. The data processing system can receive the text segment from a computing device. The text segment may be a description on an incident ticket or a transcription of a phone call describing an incident to an operator. In some cases, the transcript may be a transcription of utterances a user spoke into their building assistant. The text segment may include a string of words that the data processing system can parse to extract entities, intents, and/or keywords associated with an incident.

At step 2206, the data processing system can identify one or more entities, one or more intents, and/or one or more keywords. The data processing system can identify the one or more entities, intents, and/or keywords using natural language processing techniques. In some instances, the data processing system can use the natural language processing techniques described herein to separate the text segments into chunks and identify the entities and the intents based on the words of the chunks. The data processing system may extract parameters from the chunks and/or the text segment. The data processing system may do so by identifying named entities and/or intents from a database based on the extracted entities and/or intents. The data processing system may further extract keyword parameters by identifying matching words from the text segment to matching words in the database.

At step 2208, the data processing system can determine a satisfied incident. The data processing system can compare the extracted parameters to templates of the incidents of the database. Responsive to the parameters meeting criteria of a template of the templates, the data processing system can determine an incident associated with the template is satisfied.

At step 2210, the data processing system can determine a second entity. The second entity may be a technician that can fix or resolve the incident. In some instances, the data processing system can identify the second entity as the entity that has resolved the most incidents that have the same incident type as the satisfied incident. At step 2212, the data processing system can transmit a signal to the second entity. The data processing system may transmit the signal to a computing device of the second entity. The signal can identify the incident and indicate for the second entity to resolve the incident.

In one use case, the data processing system can extract information from a phone call transcription. The data processing system can identify intents and entities of an incident associated with the phone call using natural language processing techniques described herein. The data processing system can identify the incident and the priority of the incident (e.g., how important is it that the incident be resolved quickly). The data processing system can assign the incident to a second entity to be resolved based on the determined priority. More senior second entities may be associated with critical incidents because they have more experience, while second entities with less experience may be associated with less critical incidents so they can gain experience. The data processing system can also assign the incident to the second entity based on the experience of the second entity with similar incidents (e.g., incident with similar characteristics). In some embodiments, the data processing system can determine a length of time it took a second entity to resolve an incident based on the time between when the signal to complete the incident was sent and the time the second entity sent a signal to the data processing system indicating the incident has been resolved. The data processing system may select second entities based on who completes similar incidents the fastest.

In another use case, the life of every system is predefined in a database of the data processing system. Before running a query about finding the optimal solution for solving the incident reported, the life of the system is taken into account. Before the expiry date for any device, based on its vulnerability, the data processing system can indicate for a second entity or an end owner of the system to perform maintenance to take required measures for the system before it becomes faulty and damage prone. A complete inventory can be registered and updated frequently by an administrator. If any quantity of an item goes below a certain level of availability, then, based on its frequency of requirement, the data processing system can notify the admin to renew the stock of the item.

In another use case, the data processing system can use an image processing process to detect an incident based on a picture the data processing system receives. When an incident is detected, a user can capture an image of the incident on a mobile device. The data processing system can be fed the image as an input to an image recognition process. The image recognition process can output the entities and context of the image. The data processing system can do so based on similar images that have been tagged with entities, intents, context, and incident types. The data processing system can compare the new image to the tagged previous images to identify similarities between them. The data processing system can match the fed image or aspects (e.g., portions) of the image to the tagged images to identify entities, context and incidents from the fed image. Through repeated training sets, the algorithm can self-train. Eventually, the data processing system may be able to identify incidents based solely on photographs.

There can be three stages in the image recognition. In a preprocessing stage, initial sample datasets can be fed into the system. Based on the given samples, the data processing system can identify the grouping of data that needs to be considered for extracting meaningful information. In a feature extraction stage, the primary objective may be to extract only relevant information from the input samples. This can be achieved by various edge detection techniques. In a third stage, the data processing system can take the information obtained in the previous stages as inputs and perform an analysis to determine the features as an output.

In yet another use case, the data processing system can maintain a live database that keeps track of the incidents in a table identifying solutions to different incidents. The table can be used for future reference by a second entity that is being assigned to a similar issue. The data processing system can detect incidents and aspects about the incidents based on entities, intents, context, and/or keywords that the data processing system extracts from the incident tickets and/or the phone call transcription using natural language processing techniques. Upon receiving an incident report or a phone call transcription, the data processing system can query the database to identify similar incidents that have been resolved. Responsive to the data processing system identifying a similar incident, the data processing system can send the second entity selected to resolve the incident along with information about how the identified similar incident was resolved and references to help the second entity resolve the incident. Consequently, the second entity may resolve the incident more quickly.

The data processing system can also, if available, send a set of instructions to the second entity indicating how to resolve the incident. In some instances, the data processing system can provide a live phone line for the assistant to speak to technicians in a live chat interface provided on a computing device of the technician. The data processing system can transcribe and store the conversation.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for identifying and managing incidents in a building management system (BMS) of a building, the method comprising:

separating, by a processing circuit, a text segment into one or more chunks based on parts of speech of words of the text segment;

identifying, by a processing circuit, at least one or more entities, one or more intents, or one or more keywords from the one or more chunks;

extracting, by the processing circuit, one or more parameters from at least one of the identified one or more entities, the identified one or more intents, or the identified one or more keywords, the one or more parameters comprising a piece of building equipment of the building and a characteristic of the piece of building equipment;

determining, by the processing circuit, a satisfied incident of a plurality of incidents based on the extracted one or more parameters, the satisfied incident identifying an issue with the piece of building equipment and associated with a second entity; and transmitting, by the processing circuit, an indication of the satisfied incident to a computing device of the second entity.

2. The method of claim 1, wherein extracting the one or more parameters comprises:

comparing the one or more keywords, the one or more entities, or the one or more intents to a database, the database storing incident data comprising data associated with previous incidents in the BMS;

identifying a matching keyword, a matching entity, or a matching intent based on the comparison; and extracting the one or more parameters based on the identified matching keyword, the identified matching entity, or the identified matching intent.

3. The method of claim 1, wherein the one or more entities comprise a piece of building equipment, a space within the building, or a building identifier of the building.

4. The method of claim 1, wherein determining the satisfied incident comprises:

comparing the extracted parameters to one or more templates;

determining that the extracted parameters satisfy a template of the one or more templates; and determining the satisfied incident based on the extracted parameters satisfying the template of the one or more templates.

5. The method of claim 1, wherein the characteristic comprises a condition of the piece of building equipment or a type of the piece of building equipment.

6. The method of claim 1, wherein the text segment is a first segment, the method further comprising:

displaying, by the processing circuit, a graphical user interface to a user, the graphical user interface comprising a field for receiving a text input comprising a building equipment issue description; and receiving, by the processing circuit and via the graphical user interface, a second text segment as an input into the field for receiving a text input, wherein determining the satisfied incident is further based on the second text segment.

7. The method of claim 6, further comprising receiving the first text segment from a transcription service.

8. The method of claim 1, comprising:

receiving, by the processing circuit, an image of the piece of building equipment; and determining, by the processing circuit, image features based on the image, the image features identifying the piece of building equipment and characteristics of the piece of building equipment, wherein determining the satisfied incident is further based on the determined image features of the piece of building equipment.

9. The method of claim 1, further comprising:

determining, by the processing circuit, an incident priority based on the extracted one or more parameters; and determining, by the processing circuit, the second entity based on the determined incident priority.

10. The method of claim 1, wherein the satisfied incident is associated with a plurality of second entities, the method further comprising:

storing, by the processing circuit for a template of the satisfied incident, a counter for each of the plurality of second entities, each counter having a count identifying the number of times the respective second entity has resolved the an incident having the same incident type as the satisfied incident associated with the template;

comparing, by the processing circuit, the counts associated with each of the second entities; and selecting, by the processing circuit, the second entity responsive to the second entity being associated with the highest count of the plurality of second entities.

11. A building system for identifying and managing incidents in a building management system (BMS) of a building, the building system comprising one or more memory devices configured to store instructions thereon that, when executed by one or more processors, cause the one or more processors to:

identify at least one or more entities, one or more intents, or one or more keywords from a text segment;

compare the one or more identified keywords, the one or more identified entities, or the one or more identified intents to a database, the database storing incident data including data associated with previous incidents in the BMS;

identify a matching keyword, a matching entity, or a matching intent based on the comparison;

extract one or more parameters from at least one of the identified matching keyword, the identified matching entity, or the identified matching intent, the one or more parameters comprising a piece of building equipment of the building and a characteristic of the piece of building equipment;

determine a satisfied incident of a plurality of incidents based on the extracted one or more parameters, the satisfied incident identifying an issue with the piece of building equipment and associated with a second entity; and transmit an indication of the satisfied incident to a computing device of the second entity.

12. The building system of claim 11, wherein the instructions cause the one or more processors to identify the at least one or more entities, the one or more intents, or the one or more keywords from the text segment by:

separating the text segment into one or more chunks based on parts of speech of words of the text segment; and identifying one or more entities or one or more intents from the one or more chunks.

13. The building system of claim 11, wherein the one or more entities comprise a piece of building equipment, a space within the building, or a building identifier of the building.

14. The building system of claim 11, wherein the instructions cause the one or more processors to determine the satisfied incident by:

comparing the extracted parameters to one or more templates;

determining that the extracted parameters satisfy a template of the one or more templates; and
determining the satisfied incident based on the extracted parameters satisfying the template of the one or more templates.

15. The building system of claim 11, wherein the characteristic comprises a condition of the piece of building equipment or a type of the piece of building equipment.

16. A method for identifying and managing incidents in a building management system (BMS) of a building, the method comprising:
identifying, by a processing circuit, at least one or more entities, one or more intents, or one or more keywords from a text segment;
identifying, by the processing circuit, at least one feature from an image of a piece of building equipment of the building;
extracting, by the processing circuit, one or more parameters from at least one of the identified one or more entities, the identified one or more intents, or the identified one or more keywords, the one or more parameters comprising the piece of building equipment of the building and a characteristic of the piece of building equipment;
determining, by the processing circuit, a satisfied incident of a plurality of incidents based on the extracted one or more parameters and the at least one feature from the image, the satisfied incident identifying an issue with the piece of building equipment and associated with a second entity; and
transmitting, by the processing circuit, an indication of the satisfied incident to a computing device of the second entity.

17. The method of claim 16, wherein identifying the at least one or more entities, the one or more intents, or the one or more keywords from the text segment comprises:
separating the text segment into one or more chunks based on parts of speech of words of the text segment; and
identifying one or more entities or one or more intents from the one or more chunks.

18. The method of claim 16, wherein extracting the one or more parameters comprises:
comparing the one or more keywords of the text segment, the one or more entities, or the one or more intents to a database, the database storing incident data comprising data associated with previous incidents in the BMS;
identifying a matching keyword, a matching entity, or a matching intent based on the comparison; and
extracting the one or more parameters based on the identified matching keyword, the identified matching entity, or the identified matching intent.

* * * * *